(12) United States Patent
Zhang et al.

(10) Patent No.: US 10,200,698 B2
(45) Date of Patent: Feb. 5, 2019

(54) DETERMINING CHROMA QUANTIZATION PARAMETERS FOR VIDEO CODING

(71) Applicant: INTEL CORPORATION, Santa Clara, CA (US)

(72) Inventors: Ximin Zhang, San Jose, CA (US); Sang-Hee Lee, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 169 days.

(21) Appl. No.: 15/232,613

(22) Filed: Aug. 9, 2016

(65) Prior Publication Data
US 2018/0048901 A1 Feb. 15, 2018

(51) Int. Cl.
| | |
|---|---|
| *H04N 19/186* | (2014.01) |
| *H04N 19/172* | (2014.01) |
| *H04L 12/26* | (2006.01) |
| *H04N 19/13* | (2014.01) |
| *H04N 19/174* | (2014.01) |
| *H04N 19/124* | (2014.01) |
| *H04N 19/31* | (2014.01) |
| *H04N 19/176* | (2014.01) |
| *H04N 19/137* | (2014.01) |

(52) U.S. Cl.
CPC .......... *H04N 19/186* (2014.11); *H04L 43/16* (2013.01); *H04N 19/124* (2014.11); *H04N 19/13* (2014.11); *H04N 19/137* (2014.11); *H04N 19/172* (2014.11); *H04N 19/174* (2014.11); *H04N 19/176* (2014.11); *H04N 19/31* (2014.11)

(58) Field of Classification Search
None
See application file for complete search history.

(56) References Cited

U.S. PATENT DOCUMENTS

| | | | |
|---|---|---|---|
| 9,872,026 B2* | 1/2018 | Zhang | H04N 19/159 |
| 2003/0169820 A1* | 9/2003 | Babonneau | H04N 19/51 375/240.29 |
| 2004/0179602 A1* | 9/2004 | Le Meur | H04N 19/105 375/240.12 |
| 2004/0190622 A1* | 9/2004 | Schutten | H04N 19/51 375/240.16 |
| 2007/0280349 A1 | 12/2007 | Prieto et al. | |
| 2008/0165852 A1* | 7/2008 | Zhang | H04N 19/139 375/240.16 |
| 2014/0003497 A1 | 1/2014 | Sullivan et al. | |
| 2014/0072034 A1* | 3/2014 | Tanner | H04N 19/139 375/240.03 |

(Continued)

OTHER PUBLICATIONS

International Search Report & Written Opinion dated Oct. 17, 2017 for PCT Patent Application No. PCT/US17/40972.

*Primary Examiner* — Mohammad J Rahman
(74) *Attorney, Agent, or Firm* — Green, Howard & Mughal LLP.

(57) ABSTRACT

Techniques related to determining chroma quantization parameters for video coding are discussed. Such techniques may include generating first and second chroma quantization parameter offsets for first and second picture of a video sequence having a hierarchical coding structure such that the second chroma quantization parameter offset is greater than or equal to the first chroma quantization parameter offset in response to the first picture having a higher quality priority than the second picture.

25 Claims, 8 Drawing Sheets

(56) References Cited

U.S. PATENT DOCUMENTS

| | | | |
|---|---|---|---|
| 2014/0270330 A1* | 9/2014 | Pometun | G06T 1/0057 382/100 |
| 2014/0321545 A1* | 10/2014 | Wang | H04N 19/577 375/240.15 |
| 2015/0003518 A1 | 1/2015 | Nguyen et al. | |
| 2015/0071344 A1* | 3/2015 | Tourapis | H04N 19/15 375/240.03 |
| 2015/0326857 A1* | 11/2015 | Zhang | H04N 19/142 375/240.03 |
| 2016/0005155 A1 | 1/2016 | Sato | |
| 2016/0100170 A1 | 4/2016 | Tourapis et al. | |
| 2017/0214938 A1* | 7/2017 | Zhang | H04N 19/126 |

* cited by examiner

DETERMINING CHROMA QUANTIZATION PARAMETERS FOR VIDEO CODING

BACKGROUND

In compression/decompression (codec) systems, compression efficiency and video quality are important performance criteria. An important aspect of compression and video quality is the selection of quantization parameters (QP) for luma and for chroma. For example, proper selection of luma QP and chroma QP may achieved improved subjective and objective video quality. In the H.264/MPEG-4 advanced video coding (AVC) standard and the high efficiency video coding (HEVC) standard, a chroma quantization parameter (QP) is derived from luma QP through a look-up table. Furthermore, a chroma QP offset may be signaled at the picture level or the slice level to further adjust chroma QP.

The selection of chroma QP may provide subjective and objective improvements in the encoding process. Therefore, it may be advantageous to determine chroma QP offsets at the encoder. It is with respect to these and other considerations that the present improvements have been needed. Such improvements may become critical as the desire to compress and transmit video data becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
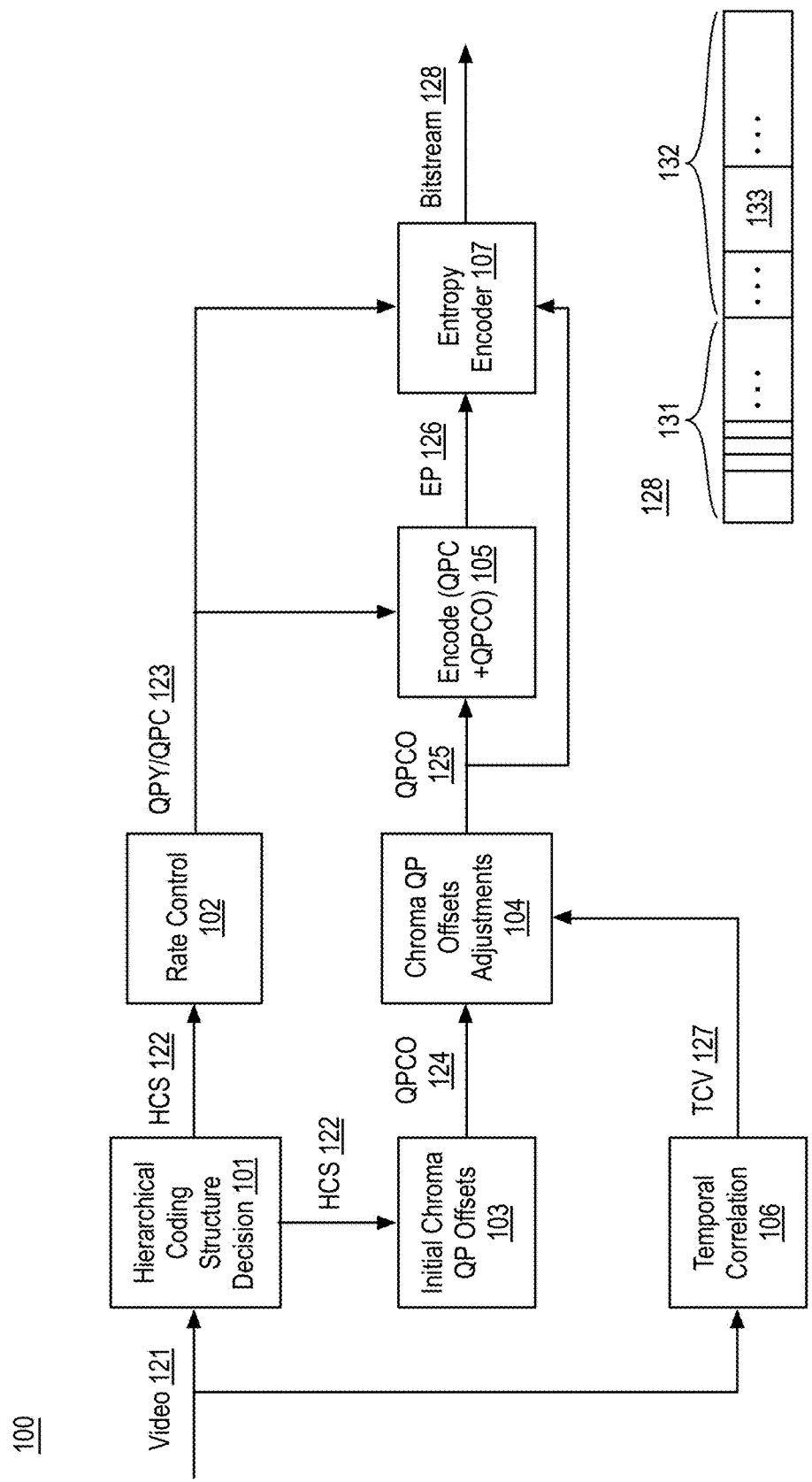
FIG. 1 is an illustrative diagram of an example system for providing video coding.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to video coding and, in particular, to the selection of chroma quantization parameters.

As described above, the selection of chroma quantization parameters (QP) may provide subjective and objective improvements in the encoding process. Current efforts in video codecs provide attempt to improve the derivation of chroma QP from luma QP based on the selection of the look-up table used to translate from luma QP to chroma QP. As discussed herein, chroma QP offsets may be determined based on the content and the encoding structure of the video being encoded. Such techniques may determine chroma QP offsets at the picture or slice level based on the group of pictures (GOP) structure of the video such that adaptive chroma QP offsets are employed to improve coding compression efficiency and video quality.

In some embodiments discussed herein, for pictures of a video sequence to be coded, a hierarchical coding structure may be determined. The hierarchical coding structure may provide for two, three, four, or more levels of hierarchy in the structure such that the pictures may have a high or low quality priority, a high, medium, or low quality priority, a high, medium-high, medium-low, or low quality priority, or the like. For example, the quality priority of a picture may correspond to the number of bits to be used to code the picture with more bits providing high quality and/or the quality priority of a picture may be used to make coding decisions. The hierarchical coding structure may be determined or implemented based on the application that is requesting the video coding. For example, an application may select the hierarchical coding structure as an encode input parameter. For example, the hierarchical coding structure may indicate a first picture of the video sequence is to be coded with a higher quality priority than a second picture of the video sequence.

Based on rate control techniques or the like, a luma quantization parameter (QPY) is determined for the pictures of the video sequence. As discussed, a chroma quantization parameter (QPC) for each color channel of the video may be determined based on translating the QPY to the QPC using a look-up table established by the codec being implemented. Furthermore, offsets to such chroma quantization parameter, chroma quantization parameter offsets (CQPO), may be determined for the pictures of the video sequence based on the hierarchical coding structure discussed above. For example, higher quality priority pictures may have a lower chroma quantization parameter offset (e.g., −2, −1, 0, or the like) and lower quality priority pictures may have a higher chroma quantization parameter offset (e.g., 0, +1, or the like). For example, a first chroma quantization parameter offset for the first picture and a second chroma quantization parameter offset for the second picture may be generated such that the second chroma quantization parameter offset is greater than the first chroma quantization parameter offset in response to the first picture having a higher quality priority than the second picture. Further discussion is provided herein related to example chroma quantization parameter offsets in the context of various hierarchical coding structure.

In addition or in the alternative, temporal correlation of the video sequence may be used to adjust the chroma quantization parameters. For example, a temporal correlation value for a portion of the video sequence may be determined. If the temporal correlation value or measurement indicates strong temporal correlation (e.g., static or unchanging video or the like), chroma quantization parameters for higher quality priority pictures may be reduced (or further reduced if already reduced based on coding structure) and/or chroma quantization parameters for lower quality priority pictures may be increased (or further increased if already increased based on coding structure). Furthermore, if the temporal correlation value or measurement indicates weak temporal correlation (e.g., video with random motion or the like), chroma quantization parameters for higher quality priority pictures may be increased and/or chroma quantization parameters for lower quality priority pictures may be decreased. In some examples, temporal correlation may be applied to color channels of the video sequence such that a first color channel has a different offset with respect to a second color channel as is discussed further herein.

Based on the chroma quantization parameters generated using such techniques, the video sequence is transformed or encoded to a compressed bitstream based on compressing the pictures of the video sequence using their corresponding chroma quantization parameters as adjusted by the discussed offsets. Furthermore, the offsets are provided in the bitstream to signal a decoder to decode the compressed bitstream using the chroma quantization parameter offsets. For example, the bitstream may include picture level or slice level parameter sets including the chroma quantization parameter offsets.

In addition or in the alternative, for a video sequence having a non-hierarchical coding structure, such chroma quantization parameter offsets may be applied to pictures of the video sequence periodically. For example, every fourth picture or the like may have its corresponding chroma quantization parameter reduced (e.g., using a −1 offset or the like). Similar to the discussed hierarchical coding structure examples, such periodic chroma quantization parameter offsets are provided in a bitstream to signal a decoder to decode the compressed bitstream using the offsets through use of picture level or slice level parameter sets or the like.

The discussed techniques may be used in any suitable coding context such as in the implementation of the H.264/MPEG-4 advanced video coding (AVC) standard, the high efficiency video coding (HEVC) standard, or any other suitable standard. Such techniques provide for effective determination of chroma quantization parameter offsets (e.g., ChromaQPOffset) based on the video content and encoding structure of the video sequence to be coded such that a group of pictures (GOP) coding structure adaptive ChromaQPOffset decision method is developed. As discussed, smaller ChromaQPOffsets are used for higher quality priority pictures (e.g., important frames) and larger ChromaQPOffsets are used for lower quality priority pictures (e.g., non-important frames). As also discussed, the value of ChromaQPOffset may be further adjusted using temporal correlation estimation, which will either increase or decrease the ChromaQPOffsets difference between important and non-important frames. Furthermore, additional techniques are provided for different ChromaQPOffset for different color channels or domains (e.g., Cb and Cr) domain to obtain better quality balance between the color channels.

FIG. 1 is an illustrative diagram of an example system 100 for providing video coding, arranged in accordance with at least some implementations of the present disclosure. As shown in FIG. 1, system 100 may include a hierarchical coding structure decision module 101, a rate control module 102, an initial chroma quantization parameter (QP) offsets module 103, a chroma quantization parameter offsets adjustments module 104, an encode module 105 (e.g., labeled Encode (QPC+QPCO)), a temporal correlation module 106, and an entropy encoder 107.

Also as shown, hierarchical coding structure decision module 101 and temporal correlation module 106 may receive video 121. Other modules or components of system 100 may receive video 121 or portions thereof as needed. System 100 may provide, for example, video compression and system 100 may be a video encoder implemented via a computer or computing device or the like. For example, system 100 may generate a bitstream 128 that is compatible with a video compression-decompression (codec) standard such as the H.264/MPEG-4 advanced video coding (AVC) standard, the high efficiency video coding (HEVC) standard, the VP8 standard, the VP9 standard, or the like. System 100 may be implemented via any suitable device such as, for example, a server, a personal computer, a laptop computer, a tablet, a phablet, a smart phone, a digital camera, a gaming console, a wearable device, a display device, an all-in-one device, a two-in-one device, or the like or platform such as a mobile platform or the like. For example, as used herein, a system, device, computer, or computing device may include any such device or platform.

System 100 may include other modules or components not shown for the sake of clarity of presentation. For example, system 100 may include a transform module, an intra prediction module, a motion estimation module, a motion compensation module, an in-loop filtering module, a reference frame buffer, a scanning module, or the like. In some examples, system 100 may include a local decode loop for generating reference frames used in the encoding process. Such modules are known to those of skill in the art and are not discussed further herein for the sake of clarity of presentation.

As discussed, hierarchical coding structure decision module 101 and temporal correlation module 106 may receive video 121. Video 121 may include any suitable video sequence, pictures of a video sequence, video frames, video pictures, sequence of video frames, group of pictures, groups of pictures, video data, or the like in any suitable resolution. For example, video 121 may be video graphics array (VGA), high definition (HD), Full-HD (e.g., 1080p), or 4K resolution video, or the like. Furthermore, video 121 may include any number of video frames, sequences of video frames, pictures, groups of pictures, or the like. Techniques discussed herein are discussed with respect to pictures and groups of pictures for the sake of clarity of presentation. However, such pictures and groups of pictures may be characterized as frames, video frames, sequences of frames, video sequences, or the like.

As shown in FIG. 1, hierarchical coding structure decision module 101 may determine and/or implement a hierarchical coding structure (HCS) 122 for video 121. For example, hierarchical coding structure decision module 101 may receive as input (not shown) a parameter or indicator indicative of a group of picture structure, a hierarchical coding structure, or the like to be applied to video 121. For example, the parameter or indicator may be received from an application or the like requesting encode of video 121 to bitstream 128. Hierarchical coding structure 122 may be determined and/or implemented using any suitable technique or techniques and hierarchical coding structure 122 may include any suitable data format indicating the hierarchical status of pictures of video 121. Hierarchical coding structure 122 may also indicate a group size of groups of pictures or the like. Furthermore, in some embodiments, hierarchical coding structure decision module 101 may apply a non-hierarchical coding structure to video 121 via hierarchical coding structure 122. For example, hierarchical coding structure 122 may indicate video 122 is to be coded using a non-hierarchical coding structure.

As shown in FIG. 1, rate control module 102 may receive hierarchical coding structure 122 (and other control information, not shown) and rate control module 102 may determine, for individual pictures of video 121, a luma quantization parameter (QPY) and a chroma quantization parameter (QPC) 123. For example, rate control module 102 may provide luma and chroma quantization parameters 123 to encode module 105 and/or entropy encoder 107. As used herein, luma and chroma quantization parameters 123 may be characterized as rate control based quantization parameters such that luma and chroma quantization parameters 123 are generated based on rate control methods. Such rate control methods may include any suitable technique or techniques. In some embodiments, the luma quantization parameter (QPY) is provided in bitstream 128 while the chroma quantization parameter (QPC) is not provided in bitstream 128 such that the chroma quantization parameter is determined (at both the encode and decode sides) using a look-up table that translates the luma quantization parameter to a chroma quantization parameter.

Furthermore, chroma quantization parameter offsets (QPCO) 125, which are discussed further herein, may be implemented (prior to encoding a picture) by encode module 105 and provided to entropy encoder 107 for inclusion in bitstream 128. For example, pictures of video 121 are encoded with the luma quantization parameter (QPY) determined by rate control module 102 and an adjusted or offset chroma quantization parameter (QPC+QPCO) to generate encoded picture data (EP) 126. Furthermore, the luma quantization parameter (QPY) and the chroma quantization parameter offset (QPCO) are provided in bitstream 128. For encoded picture data 126, the luma quantization parameter of luma quantization parameter and a chroma quantization parameter 123, and chroma quantization parameter offsets 125 (or chroma quantization parameter offsets 125 if temporal correlation adjustments are not used) are provided to entropy encoder for inclusion in bitstream 128.

As shown, in some embodiments, bitstream 128 may include a header portion 131 and a data portion 132. In some examples, picture level or slice level parameters or parameter sets include chroma quantization parameter offsets as discussed further herein. For example, chroma quantization parameter offsets for pictures of video 121 may be provided via bitstream 128. Furthermore, data portion 132 may include encoded picture data 133 for coded pictures of video 121. Such encoded picture data 133 may include, for example, encoded quantized transform coefficients, encoded motion vector data, encoded picture reconstruction data, or the like.

For example, chroma quantization parameter offsets may be transmitted via header portion 131 of bitstream 128. In an embodiment, the chroma quantization parameter offsets discussed herein (e.g., chroma quantization parameter offsets 125 or chroma quantization parameter offsets 124) are finalized, they are used for encoding (e.g., by encode module 105) and entropy encoded (e.g., by entropy encoder 107) in a picture parameter set header with "pps_cb_qp_offset, pps_cr_qp_offset" and a slice header with "slice_cb_qp_offset, slice_cr_qp_offset" such that cb and cr are indicative the Cb and Cr color channels. Using such a syntax, for a high quality level picture, the Chroma QP offsets (e.g., pps_cb_qp_offset+slice_cb_qp_offset and pps_cr_qp_offset+slice_cr_qp_offset) are less or equal to those for lower quality level pictures. Examples of such header data for chroma quantization parameter offsets are discussed further herein.

Turning now to discussion of chroma quantization parameter offsets, hierarchical coding structure 122 may be received by initial chroma quantization parameter offsets module 103. Based on hierarchical coding structure 122, initial chroma quantization parameter offsets module 103 generates chroma quantization parameter offsets (QPCO) 124. Chroma quantization parameter offsets 124 may be generated based on hierarchical coding structure 122 using any suitable technique or techniques. In an embodiment, chroma quantization parameter offsets 124 include a chroma quantization parameter offset (which may be zero) for each picture of video 121 based on the hierarchical ranking, quality priority, location in the hierarchical coding structure, or the like of the picture. For example, pictures having a high hierarchical ranking or quality priority may be provided a smaller chroma quantization parameter offset and pictures having a low hierarchical ranking or quality priority may be provided a larger chroma quantization parameter offset. Any number of levels of hierarchical rankings or the like may be provided.

Figure 2:
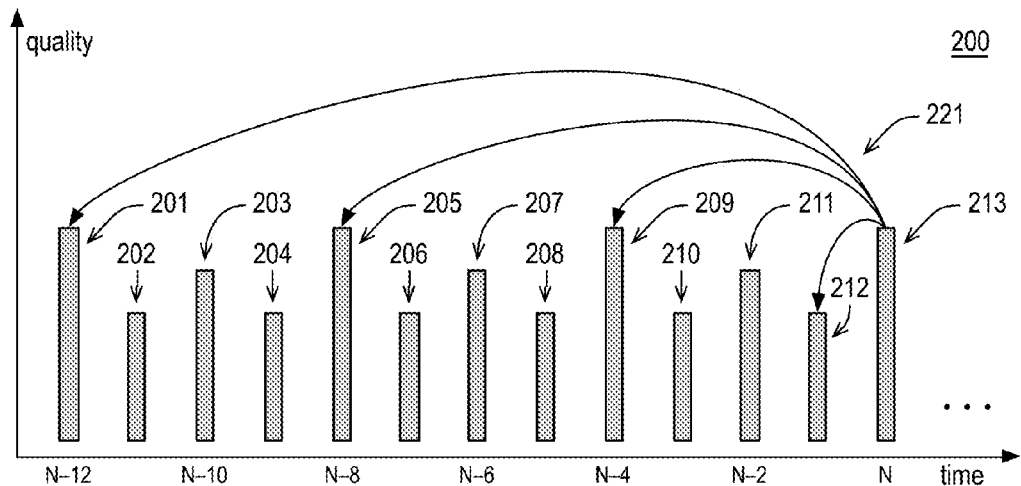
FIG. 2 illustrates an example sequence of pictures having a three level hierarchical coding structure.

FIG. 2 illustrates an example sequence of pictures 200 having a three level hierarchical coding structure, arranged in accordance with at least some implementations of the present disclosure. With reference to FIG. 1, video 121 may include sequence of pictures 200. In an embodiment, sequence of pictures 200 may be a hierarchical coding sequence of pictures having three hierarchical levels. Such hierarchical levels or quality priorities or the like may be characterized as high, medium, and low or first, second, and third, or the like. As shown in FIG. 2, sequence of pictures 200 may include pictures 201-213 such that pictures 201, 205, 209, and 213 are high quality priority pictures, first hierarchical level pictures or the like, pictures 203, 207, and 211 are medium quality priority pictures, second hierarchical level pictures or the like, and pictures 202, 204, 206, 208, 210, and 212 are low quality priority pictures, third hierarchical level pictures or the like. FIG. 2 also illustrates example prediction references for picture 213. As shown, pictures 201-213 are in a temporal order along a time axis (and as labeled with reference to the Nth picture 213). Furthermore, the relative heights of pictures 201-213 indicate approximate numbers of bits (e.g., along a quality axis) used for coding the pictures.

As shown in FIG. 2, individual pictures of pictures 200 (e.g., inter pictures) of a sequence of video with a hierarchical coding structure are assigned to different quality levels. For example, pictures 200 may have a low delay hierarchical coding structure such that pictures 200 are assigned to high, medium, and low quality levels as discussed. Typically, luma quantization parameters (QPY) assigned to high quality priority pictures such as pictures 201, 205, 209, and 213 are lower than those for other pictures such that better quality is achieved for pictures 201, 205, 209, and 213. Furthermore, luma quantization parameters (QPY) assigned to medium quality priority pictures such as pictures 203, 207, and 211 are often greater than those assigned to high quality priority pictures but less than those assigned to low quality priority pictures. Similarly, luma quantization parameters (QPY) assigned to low quality priority pictures such as pictures 202, 204, 206, 208, 210, and 212 are typically higher than those for other pictures. Also, as discussed, chroma quantization parameters (QPC) are determined from luma quantization parameters (QPY) using a translation based on a look up table.

Based on the hierarchical coding structure of pictures 200, chroma quantization parameter offsets 124 are determined (e.g., by initial chroma quantization parameter offsets module 103). In the example of FIG. 2, high quality priority pictures such as 201, 205, 209, and 213 are provided a smaller or low chroma quantization parameter offset, low quality priority pictures such as pictures 202, 204, 206, 208, 210, and 212 are provided a larger or high chroma quantization parameter offset, and medium quality priority pictures such as pictures 203, 207, and 211 are provided a median chroma quantization parameter offset (e.g., that is between the high and low chroma quantization parameter offsets). For example, a first chroma quantization parameter offset is applied to high quality priority pictures, a second chroma quantization parameter offset is applied to medium quality priority pictures, and a third chroma quantization parameter offset is applied to low quality priority pictures such that the first chroma quantization parameter offset is less than or equal to the second chroma quantization parameter offset and the second chroma quantization parameter offset is less than or equal to the third chroma quantization parameter offset. Any suitable values may be used for the chroma quantization parameter offsets. In some three level hierarchical coding structure embodiments, the first chroma quantization parameter offset is −1 or −2, the second quantization parameter offset is 0 or −1, and the third quantization parameter offset is +1 or 0.

For example, as discussed, the chroma quantization parameter offsets may be transmitted by a picture parameter set header and/or a slice header of bitstream 128. In an embodiment, for a three level hierarchical coding structure having a high, low, medium, low, high, and so on picture hierarchy order, the picture parameter set header may be set as zero and a distribution of chroma quantization parameter offsets may be provided in a slice header as follows: [−1, +1, 0, +1, −1, +1, 0, +1, . . . ] for examples where the first chroma quantization parameter offset is −1, the second quantization parameter offset is 0, and the third quantization parameter offset is +1. In another embodiment, a distribution of chroma quantization parameter offsets may be provided in a slice header as follows: [−2, 0, −1, 0, −2, 0, −1, 0, . . . ] for examples where the first chroma quantization parameter offset is −2, the second quantization parameter offset is −1, and the third quantization parameter offset is 0.

As discussed, FIG. 2 illustrates an embodiment with a three level hierarchical coding structure. In another embodiment, a two level hierarchical coding structure is used such that high quality priority pictures and low quality priority pictures alternate. For example, with reference to FIG. 2, if medium quality priority pictures such as pictures 203, 207, and 211 were instead high quality priority pictures, pictures 200 would have a sequence of high, low, high, low, and so on. In such examples, a first chroma quantization parameter offset is applied to high quality priority pictures and a second chroma quantization parameter offset is applied to low quality priority pictures such that the first chroma quantization parameter offset is less than the second chroma quantization parameter offset. Any suitable values may be used for the chroma quantization parameter offsets. In some two level hierarchical coding structure embodiments, the first chroma quantization parameter offset is −1 and the second quantization parameter offset is +1.

For transmission via bitstream 128, the chroma quantization parameter offsets may be provided by a picture parameter set header and/or a slice header as discussed. In an embodiment, for a two level hierarchical coding structure having a high-low-high-low and so on picture hierarchy order, the picture parameter set header may be set as zero and a distribution of chroma quantization parameter offsets may be provided in a slice header as follows: [−1, +1, −1, +1, −1, +1, ... ] for examples where the first chroma quantization parameter offset is −1 and the second quantization parameter offset is +1. However, as discussed any first and second chroma quantization parameter offsets may be used. In another embodiment, a distribution of chroma quantization parameter offsets may be provided in a slice header as follows: [−2, 0, −1, 0, −2, 0, −1, 0, ... ] for examples where the first chroma quantization parameter offset is −2, the second quantization parameter offset is −1, and the third quantization parameter offset is 0.

Furthermore, the hierarchical coding structure based chroma quantization parameter offset selection techniques may be applied to hierarchical coding structures having any number of levels such as three (as illustrated and discussed with respect to FIG. 2), two (as discussed with respect to FIG. 2), four, or more.

Figure 3:
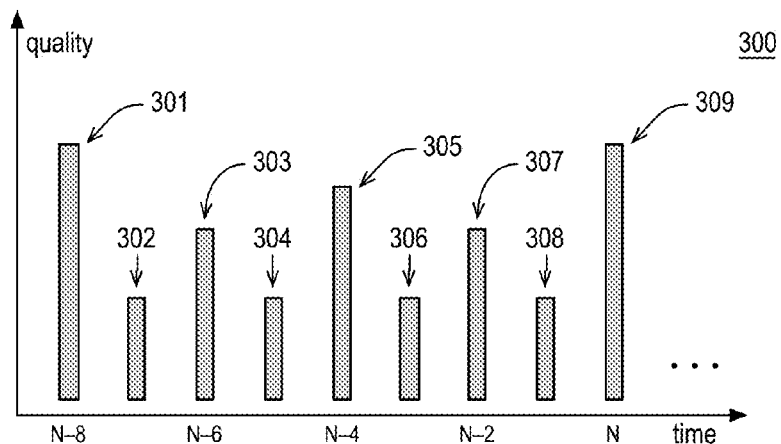
FIG. 3 illustrates an example sequence of pictures having a four level hierarchical coding structure.

FIG. 3 illustrates an example sequence of pictures 300 having a four level hierarchical coding structure, arranged in accordance with at least some implementations of the present disclosure. With reference to FIG. 1, video 121 may include sequence of pictures 300 and sequence of pictures 300 may be a hierarchical coding sequence of pictures having four hierarchical levels. Such hierarchical levels or quality priorities or the like may be characterized as high, medium-high, medium-low, and low or first, second, third, and fourth or the like. As shown in FIG. 3, sequence of pictures 300 may include pictures 301-309 such that pictures 301 and 309 are high quality priority pictures, first hierarchical level pictures or the like, picture 305 is a medium-high quality priority pictures, second hierarchical level picture or the like, pictures 303 and 307 are a medium-low quality priority pictures, third hierarchical level picture or the like, and pictures 302, 304, 306, and 308 are low quality priority pictures, fourth hierarchical level pictures or the like. As discussed with respect to FIG. 2, pictures 301-309 are in a temporal order along a time axis (and as labeled with reference to the Nth picture 309) and the relative heights of pictures 301-309 indicate approximate numbers of bits (e.g., along a quality axis) used for coding the pictures.

Individual pictures of pictures 300 (e.g., inter pictures) of a sequence of video with a hierarchical coding structure are assigned to different quality levels. For example, pictures 300 may have a low delay hierarchical coding structure and, typically, luma quantization parameters (QPY) assigned to pictures 300 increase along levels of the hierarchical coding structure. Also, as discussed, chroma quantization parameters (QPC) are determined from luma quantization parameters (QPY) using a translation based on a look up table.

Based on the four level hierarchical coding structure of pictures 300, chroma quantization parameter offsets 124 are determined (e.g., by initial chroma quantization parameter offsets module 103). In the example of FIG. 3, high quality priority pictures such as 301 and 309 are provided a smallest or low chroma quantization parameter offset, medium-high quality priority pictures such as picture 305 is provided a second-smallest (e.g., medium-low) chroma quantization parameter offset, medium-low quality priority pictures such as pictures 303 and 307 are provided a next-smallest or second-highest (e.g., medium-high) chroma quantization parameter offset and low quality priority pictures such as pictures 302, 304, 306, and 308 are provided a highest chroma quantization parameter offset. For example, a first chroma quantization parameter offset is applied to high quality priority pictures, a second chroma quantization parameter offset is applied to medium-high quality priority pictures, a third chroma quantization parameter offset is applied to medium-low quality priority pictures, and a fourth chroma quantization parameter offset is applied to low quality priority pictures such that the first chroma quantization parameter offset is less than or equal to the second chroma quantization parameter offset, the second chroma quantization parameter offset is less than or equal to the third chroma quantization parameter offset, and the third chroma quantization parameter offset is less than or equal to the fourth chroma quantization parameter offset. Any suitable values may be used for the chroma quantization parameter offsets. In some four level hierarchical coding structure embodiments, the first chroma quantization parameter offset is −2 or −1, the second quantization parameter offset is 0 or −1, the third quantization parameter offset is +1 or 0, and the fourth quantization parameter offset is 0, +1, or +2. In an embodiment, the first chroma quantization parameter offset is −2, the second quantization parameter offset is −1, the third quantization parameter offset is 0, and the fourth quantization parameter offset is +1.

Furthermore, as discussed, the chroma quantization parameter offsets may be transmitted by a picture parameter set header and/or a slice header of bitstream 128. In an embodiment, for a four level hierarchical coding structure having a high, low, medium-low, low, medium-high, low, medium-low, low, high, and so on picture hierarchy order, the picture parameter set header may be set as zero and a distribution of chroma quantization parameter offsets may be provided in a slice header as follows: [−2, +1, 0, +1, −1, +1, 0, +1, −2, +1, 0, +1, −1, +1, 0, +1, ... ] for examples where the first chroma quantization parameter offset is −2, the second quantization parameter offset is −1, the third quantization parameter offset is 0, and the fourth quantization parameter offset is +1. In another embodiment, a distribution of chroma quantization parameter offsets may be provided in a slice header as follows: [−2, 0, 0, 0, −1, 0, 0, 0, −2, 0, 0, 0, −1, 0, 0, 0, ... ] for examples where the first chroma quantization parameter offset is −2, the second quantization parameter offset is −1, the third quantization parameter offset is 0, and the fourth quantization parameter offset is 0.

Returning now to FIG. 1, the discussed chroma quantization parameter offsets 124 may be provided to chroma quantization parameter offsets adjustments module 104 such that temporal correlation based chroma quantization parameter offset adjustments may be made. As discussed, such temporal correlation based chroma quantization parameter offset adjustments are optional and, in some embodiments, chroma quantization parameter offsets 124 are provided to encode module 105 and entropy encoder 107 for further processing as discussed herein.

In embodiments where temporal correlation based chroma quantization parameter offset adjustments are made, temporal correlation module 106 receives video 121 and temporal correlation module 106 generates temporal correlation values 127 based on video 121. Temporal correlation values 127 may include any suitable data, values, indicators, or the like indicative or representative of a temporal correlation for pictures of video 121. In an embodiment, temporal correlation values 127 may include statistics obtained by motion estimation on down-sampled video 121. In an embodiment, temporal correlation values 127 may include the number of blocks having a small motion vector (e.g., small motion vector blocks) and the number of total blocks of pictures of video 121. In an embodiment, temporal correlation values 127 may include the ratio of the number of blocks having a small motion vector and the number of total blocks of pictures of video 121.

Furthermore, temporal correlation values 127 may be generated for video 121 using any available channels or domains of video 121. For example, video 121 may include a luma channel and first and second color channels (e.g., a Cb channel and a Cr channel or the like). Temporal correlation values 127 may be based on one, any two, or all three color channels. In an embodiment, temporal correlation values 127 are determined based on the luma channel. In an embodiment, temporal correlation values 127 are determined based on the color channels.

As discussed further herein, in some examples, chroma quantization parameter offset adjustments (or just offsets) are made for the color channels of video 121 independently. In such examples, temporal correlation module 106 provides for separate temporal correlation values 127 for each color channel independently. For example, temporal correlation values 127 may include a first temporal correlation value or values for a first color channel of video 121 (e.g., the Cb channel) and a second temporal correlation value or values for a second color channel of video 121 (e.g., the Cr channel).

Temporal correlation values 127 may be generated based on any number of pictures of video 121. In an embodiment, temporal correlation values 127 are determined on a picture by picture basis using a number (e.g., one or more) of previous pictures. For example, temporal correlation values 127 may be based on a portion of video 121 including the most recent picture of video such that chroma quantization parameter offsets adjustments module 104 may make chroma quantization parameter adjustments using temporal correlation values 127 generated using the current picture and any number of temporally previous pictures of video 121.

As shown, chroma quantization parameter offsets adjustments module 104 receives chroma quantization parameter offsets 124 and temporal correlation values 127. Chroma quantization parameter offsets adjustments module 104 adjusts chroma quantization parameter offsets 124 based on temporal correlation values 127 to generate chroma quantization parameter offsets (QPCO) 125. For example, chroma quantization parameter offsets 125 may have further adjustments or offsets or the like with respect to chroma quantization parameter offsets 124 based on temporal correlation values 127. Chroma quantization parameter offsets adjustments module 104 may generate chroma quantization parameter offsets 125 using any suitable technique or techniques.

In an embodiment, if, based on temporal correlation values 127, a determination is made that video sequence 121, or a pertinent portion thereof, has a strong temporal correlation, the chroma quantization parameter offsets for high quality priority pictures (e.g., high hierarchical level pictures) are reduced and the chroma quantization parameter offsets for low quality priority pictures (e.g., low hierarchical level pictures) are increased. Furthermore, if three hierarchical levels are used, the chroma quantization parameter offsets for medium quality priority pictures may remain unchanged. For four hierarchical levels, the chroma quantization parameter offsets for medium-high and medium low quality priority pictures may remain unchanged. For example, video including strong temporal correlation may include static or largely unchanging video scenes such video conferencing sequences or the like. In an embodiment, the chroma quantization parameter offsets for high quality priority pictures are reduced by 1 (e.g., a −1 offset or adjustment is provided) and the chroma quantization parameter offsets for low quality priority pictures are increased by 1 (e.g., a +1 offset or adjustment is provided). However, any quantity of reduction (e.g., −1, −2, or −3 offset) or increase (e.g., +1, +2, or +3 offset) may be provided. The reduction and increase may be the same or they may be different.

If, based on temporal correlation values 127, a determination is made that video sequence 121, or a pertinent portion thereof, has a weak temporal correlation, the chroma quantization parameter offsets for high quality priority pictures (e.g., high hierarchical level pictures) are increased and the chroma quantization parameter offsets for low quality priority pictures (e.g., low hierarchical level pictures) are reduced. Furthermore, if three hierarchical levels are used, the chroma quantization parameter offsets for medium quality priority pictures may remain unchanged. For four hierarchical levels, the chroma quantization parameter offsets for medium-high and medium low quality priority pictures may remain unchanged. For example, video including weak temporal correlation may include video clips with random motion or the like. In an embodiment, the chroma quantization parameter offsets for high quality priority pictures are increased by 1 (e.g., a +1 offset or adjustment is provided) and the chroma quantization parameter offsets for low quality priority pictures are decreased by 1 (e.g., a −1 offset or adjustment is provided). However, any quantity of increase (e.g., +1, +2, or +3 offset) or reduction (e.g., −1, −2, or −3 offset) The increase and reduction may be the same or they may be different.

The determination of whether video 121, or a portion thereof, has strong or weak temporal correlation may be made using any suitable technique or techniques. In an embodiment, a temporal correlation value is compared to a threshold to determine if strong temporal correlation is detected and to another (or the same) threshold to determine if weak temporal correlation is detected. For example, a predetermined threshold may be used to determine whether weak or strong temporal correlation is detected. In another embodiment, multiple thresholds may be used such that a video sequence may have strong temporal correlation (if the temporal correlation value is greater than a first threshold for example), weak temporal correlation (if the temporal correlation value is less than a second threshold for example), or undetermined temporal correlation (if the temporal correlation value is between the first and second thresholds). Although discussed with respect to thresholding, any suitable techniques may be used to determine, based on temporal correlation values 127, whether video 121 has strong, weak, or undetermined temporal correlation.

As discussed, in some embodiments, the chroma quantization parameter offsets adjustments may be applied such that they are the same for both color channels of video 121. In other embodiments, the offset adjustments may be made independently for the color channels. In an embodiment, video 121 had a luma channel and two color channels (e.g., a first and a second) and temporal correlation values are determined independently for the two color channels. For example, temporal correlation may be performed for the first color channel and the second color channel independently. Furthermore, a first chroma quantization parameter offset adjustment for the first color channel a second chroma quantization parameter offset adjustment for the second color channel may be determined independently.

Such independently determined offset adjustments may be provided as discussed above. For example, for a first color channel, a determination may be made as to whether the first color channel has strong or weak temporal correlation and adjustments to the chroma quantization parameter offsets may be made as discussed above (if there is strong temporal correlation, chroma quantization parameter offsets for higher quality priority pictures are reduced and chroma quantization parameter offsets for lower quality priority pictures are increased; if there is weak temporal correlation, chroma quantization parameter offsets for higher quality priority pictures are increased and chroma quantization parameter offsets for lower quality priority pictures are reduced). Similarly, for a second color channel, a determination may be made as to whether the second color channel has strong or weak temporal correlation and adjustments to the chroma quantization parameter offsets may be made as discussed above (if there is strong temporal correlation, chroma quantization parameter offsets for higher quality priority pictures are reduced and chroma quantization parameter offsets for lower quality priority pictures are increased; if there is weak temporal correlation, chroma quantization parameter offsets for higher quality priority pictures are increased and chroma quantization parameter offsets for lower quality priority pictures are reduced).

Using such techniques, different and independent chroma quantization parameter offsets may be provided. For example, in some video contexts, the temporal correlation of first and second (e.g., Cr and Cb) can be different. The discussed techniques may thereby provide adaptive and color channel independent chroma quantization parameter offsets. As discussed, such different color channel chroma quantization parameter offsets may be signaled via bitstream 128. The color channel chroma quantization parameter offsets may be transmitted by a picture parameter set header and/or a slice header of bitstream 128. In an embodiment, the chroma offset value in a picture parameter is set as pps_cb_qp_offset=pps_cr_qp_offset-c such that c is a constant with a value in the range of −3 to 4, inclusive.

As discussed with respect to initial chroma quantization parameter offsets module 103, chroma quantization parameter offsets may be determined for hierarchical video sequences. In other embodiments, chroma quantization parameter offsets may be determined for non-hierarchical video sequences. For example, with reference to FIG. 1, hierarchical coding structure 122 may indicate video 121 has a non-hierarchical coding structure such that each picture or each inter picture of video 121 has the same quality priority, level, or the like. For example, video 121 may be coded using low delay coding without use of a hierarchical coding structure. In such examples, a chroma quantization parameter offset to reduce the chroma quantization parameter may be inserted periodically by chroma quantization parameter offsets module 103.

Figure 4:
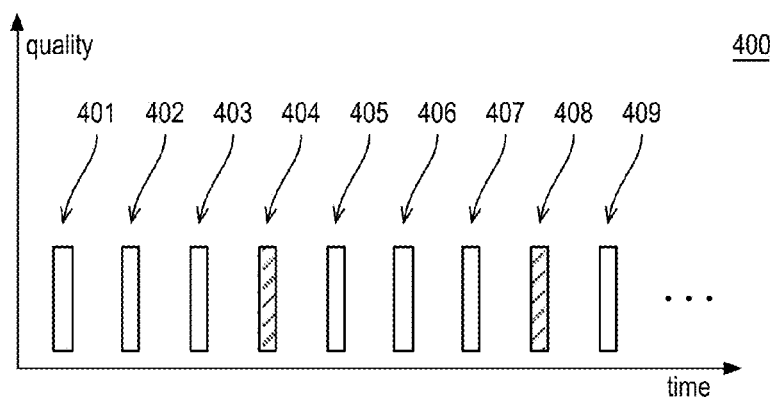
FIG. 4 illustrates an example sequence of pictures having no hierarchical coding structure.

FIG. 4 illustrates an example sequence of pictures 400 having no hierarchical coding structure, arranged in accordance with at least some implementations of the present disclosure. With reference to FIG. 1, video 121 may include sequence of pictures 400. In an embodiment, sequence of pictures 400 may be a low delay (LD) coding sequence of pictures without a hierarchical coding structure. As shown in FIG. 4, sequence of pictures 200 may include pictures 401-409 such that pictures 401-409 are inter pictures having the same quality priority (e.g., no hierarchy is applied thereto). Such a structure may be characterized as a non-hierarchical coding structure, a flat coding structure, or the like.

In an embodiment, for pictures 400 having no hierarchical coding structure, chroma quantization parameter offsets that reduce the operative chroma quantization parameter may be applied or inserted periodically in pictures 400. For example, a chroma quantization parameter offset of −1 or −2 or the like may be applied every Nth picture of pictures 400. In the example of FIG. 4, every fourth picture of pictures 400 such as pictures 404, 408 (as illustrated by hatching) have a corresponding chroma quantization parameter offset to reduce the chroma quantization parameter (and pictures 401, 402, 403, 405, 406, 407, and 409 do not have an offset). In other embodiments, every second, third, fifth, or sixth picture has a chroma quantization parameter offset to provide a reduction.

The chroma quantization parameter offsets discussed with respect to FIG. 4 may be transmitted by a picture parameter set header and/or a slice header of bitstream 128. In an embodiment, for a non-hierarchical coding structure, the picture parameter set header may be set as zero and a distribution of chroma quantization parameter offsets may be provided in a slice header as follows: [−1, 0, 0, 0, −1, 0, 0, 0, . . . ] for examples where a chroma quantization parameter offset of −1 is applied every fourth picture. In an embodiment, the picture parameter set header may be set as zero and a distribution of chroma quantization parameter offsets may be provided in a slice header as follows: [−1, 0, 0, −1, 0, 0, . . . ] for examples where a chroma quantization parameter offset of −1 is applied every third picture.

Figure 5:
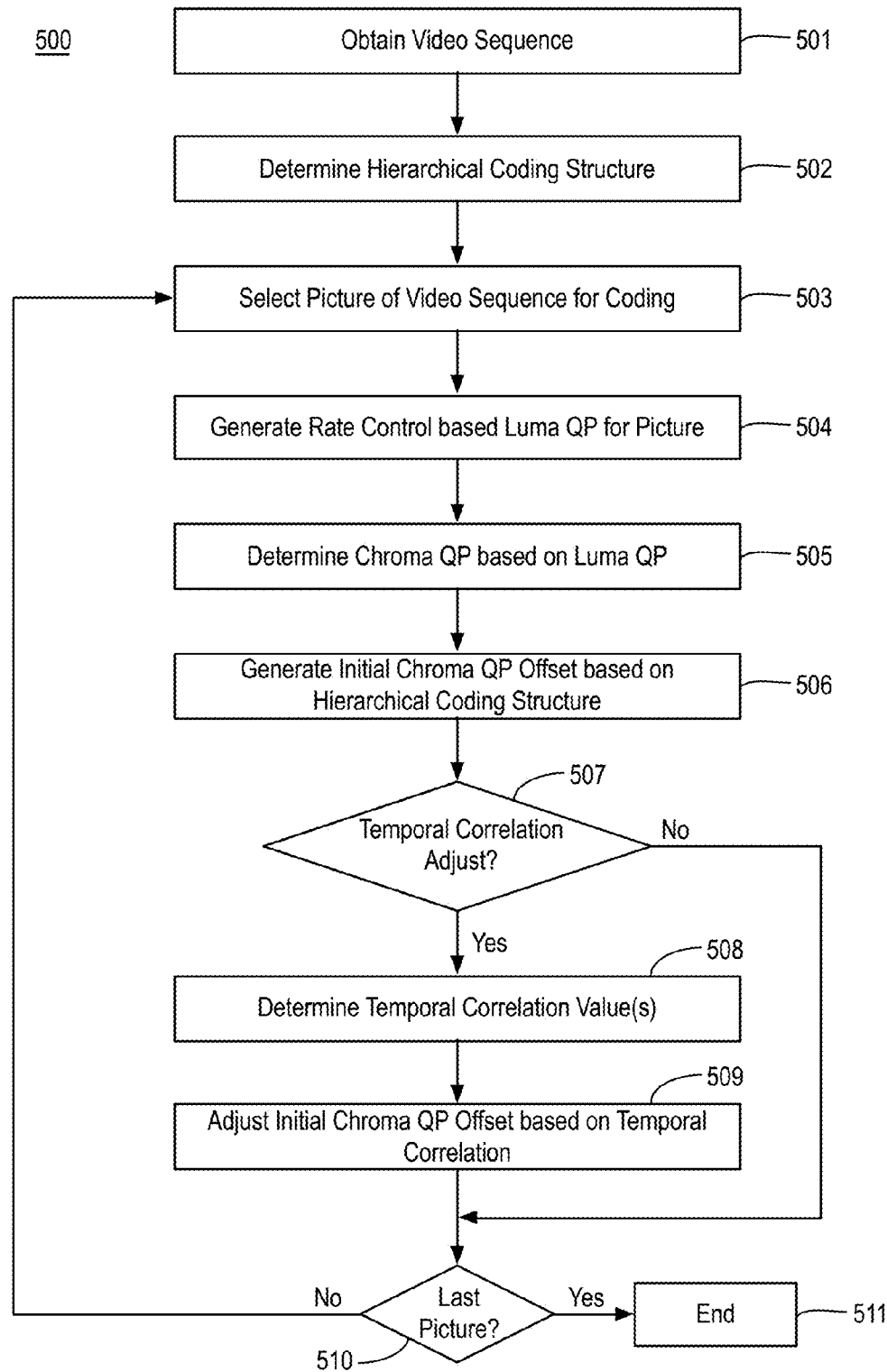
FIG. 5 is a flow diagram illustrating an example process for video coding including selection of chroma quantization parameter offsets for video having a hierarchical coding structure.

FIG. 5 is a flow diagram illustrating an example process 500 for video coding including selection of chroma quantization parameter offsets for video having a hierarchical coding structure, arranged in accordance with at least some implementations of the present disclosure. Process 500 may include one or more 501-511 as illustrated in FIG. 5. Process 500 may be performed by a device (e.g., system 100 or any other system or device discussed herein) to code a video sequence. Process 500 may be performed at a video sequence level or the like and process 500 may be repeated for any number of video sequences or the like. For example Process 500 may begin at operation 501, where a video sequence may be obtained. The video sequence may be obtained using any suitable technique or techniques. In an embodiment, the video sequence may be received by a system such as system 100 for encode processing. For example, an application or user may evoke system 100 to provide video coding and the evocation may include the video sequence. In another embodiment, a camera and/or video preprocessing circuitry or the like may provide a video sequence for encode.

Processing may continue at operation 502, where a hierarchical coding structure is determined for the video sequence (e.g., for pictures of the video sequence) obtained at operation 501. The hierarchical coding structure may be determined using any suitable technique or techniques. In an embodiment, the hierarchical coding structure is received as a selection by an application or a user that is evoking a system to provide video coding. For example, the hierarchical coding structure may be received as a parameter selection. In an embodiment, the hierarchical coding structure is a default hierarchical coding structure. As discussed herein, the hierarchical coding structure may provide a hierarchical ranking to pictures of the video sequence such that the hierarchical coding structure indicates a first picture of the video sequence is to be coded with a higher quality priority than a second picture of the video sequence.

The hierarchical coding structure may have any number of levels in the hierarchy such as two, three, four, or more. For example, a two level hierarchical coding structure may provide that some pictures are to be coded with a high quality priority or first level priority and other pictures are to be coded with a low quality priority or second level priority.

Such high, low quality priorities may have any suitable pattern such as alternating, low quality priority pictures interspersed at a regular interval (e.g., every third frame or the like), high quality priority pictures interspersed at a regular interval (e.g., every third frame or the like), and so on.

A three level hierarchical coding structure may provide that some pictures are to be coded with a high quality priority or first level priority, some are to be coded with a medium quality priority or second level priority, and other pictures are to be coded with a low quality priority or third level priority. Such pictures may be provided in any pattern by the hierarchical coding structure. For example, as discussed with respect to FIG. 2, the hierarchical coding structure may provide a pattern of high, low, medium, low, high, low, medium, low, and so on. Such a pattern of a three level hierarchical coding structure may be characterized as having a group of picture size of four (e.g., with each group of pictures repeating the high, low, medium, low pattern). In some examples, a three level hierarchical coding structure may be generated responsive to the group of pictures size being four, for example.

Furthermore, a four level hierarchical coding structure may provide that some pictures are to be coded with a high quality priority or first level priority, some are to be coded with a medium-high quality priority or second level priority, some are to be coded with a medium-low quality priority or third level priority, and other pictures are to be coded with a low quality priority or fourth level priority. Such pictures may be provided in any pattern by the hierarchical coding structure. For example, as discussed with respect to FIG. 3, the hierarchical coding structure may provide a pattern of high, low, medium-low, low, medium-high, low, medium-low, low, high, and so on. Such a pattern of a four level hierarchical coding structure may be characterized as having a group of picture size of eight (e.g., with each group of pictures repeating the high, low, medium-low, low, medium-high, low, medium-low, low pattern). In some examples, a four level hierarchical coding structure may be generated responsive to the group of pictures size being eight, for example.

Processing may continue at operation 503, where a picture of the video sequence is selected for coding. For example, pictures of the video sequence may be processed in an encode order that may match or differ from the temporal order of the pictures of the video sequence. Furthermore, although operations of process 500 are discussed sequentially for the sake of clarity of presentation, any of the operations may be provided in parallel or out of order.

Processing may continue at operation 504, where a rate control based luma quantization parameter is generated for the picture selected at operation 503. The luma quantization parameter may be generated using any suitable technique or techniques such as rate distortion optimization techniques or the like. Furthermore, the luma quantization parameter may be based in part on the hierarchical coding structure determined at operation 502.

Processing may continue at operation 505, where a chroma quantization parameter or chroma quantization parameters may be determined for the picture selected at operation 503. The chroma quantization parameter(s) may be determined using any suitable technique or techniques. For example, the chroma quantization parameter(s) may be generated for the picture based on applying a look up table to the luma quantization parameter generated at operation 504. For example, if the coding performed by process 500 is in conformance with a standard, the standard may define a look up table that translates the luma quantization parameter to the chroma quantization parameter(s). In an embodiment, the chroma quantization parameter is the same for the color channels (e.g., Cb, Cr) of the video sequence. In some embodiments, different chroma quantization parameters are determined for the color channels of the video sequence.

Processing may continue at operation 506, where an initial chroma quantization parameter offset is generated for the picture based on the hierarchical coding structure determined and applied at operation 502. The initial chroma quantization parameter offset may be generated using any suitable technique or techniques. In an embodiment, a determination is made as to the hierarchical coding structure and the quality priority or level or the like of the current picture. For example, based on the hierarchical coding structure, a look up table or similar data structure may be generated that translates an input (e.g., the quality priority of a picture) to an initial chroma quantization parameter offset. Then, based on the quality priority of the current picture selected at operation 503, an initial chroma quantization parameter offset may be generated. For example, for any number of levels of a hierarchical coding structure, operation 506 may generate initial chroma quantization parameter offsets such that an offset at a higher level is always less than or equal to the offset at the next lower level.

For example, for a two level hierarchical coding structure (e.g., with high and low quality priority pictures), the initial chroma quantization parameter offset may be −1 for high quality level pictures and +1 for low quality level pictures. However, any such values may be used such that the high quality level picture offset is less than the low quality level picture offset. As discussed, if the two level hierarchical coding structure provides a pattern alternating high and low quality level pictures, the initial chroma quantization parameter offsets may be provided (e.g., in a slice header of a bitstream) with the following pattern: [−1, +1, −1, +1, −1, +1, . . . ].

For a three level hierarchical coding structure (e.g., with high, medium, and low quality priority pictures), the initial chroma quantization parameter offset may be −1 or −2 for high quality level pictures, +1 or 0 for medium quality level pictures, and +1 or 0 for low quality level pictures. However, any such values may be used such that the high quality level picture offset is less than or equal to the medium quality level picture offset, which is less than or equal to the low quality level picture offset. As discussed, if the three level hierarchical coding structure provides a pattern of high, low, medium, low, and so on quality level pictures (as shown in FIG. 2), the initial chroma quantization parameter offsets may be provided (e.g., in a slice header of a bitstream) with any of the following patterns: [−1, +1, 0, +1, −1, +1, 0, +1, . . . ] or [−2, 0, −1, 0, −2, 0, −1, 0, . . . ].

For a four level hierarchical coding structure (e.g., with high, medium-high, medium-low, and low quality priority pictures), the initial chroma quantization parameter offset may be −2 or −1 for high quality level pictures, 0 or −1 for medium-high quality level pictures, +1 or 0 for medium-low quality level pictures, and 0, +1, or +2 for low quality level pictures. However, any such values may be used such that the high quality level picture offset is less than or equal to the medium-high quality level picture offset, which is less than or equal to the medium-low quality level picture offset, which is less than or equal to the low quality level picture offset. As discussed, if the four level hierarchical coding structure provides a pattern of high, low, medium-low, low, medium-high, low, medium-low, low, and so on quality level pictures (as shown in FIG. 3), the initial chroma quantization parameter offsets may be provided (e.g., in a slice header of a bitstream) with any of the following patterns: [−2, +1, 0, +1, −1, +1, 0, +1, −2, +1, 0, +1, −1, +1, 0, +1, . . . ] or [−2, 0, 0, 0, −1, 0, 0, 0, −2, 0, 0, 0, −1, 0, 0, 0, . . . ].

As discussed, at operation 506, an initial chroma quantization parameter offset is determined for a current picture. As such selections are made across pictures, the initial chroma quantization parameter offsets may have a pattern based on the hierarchical coding structure of the video sequence. As is discussed further below, such initial chroma quantization parameter offsets may be adjusted based on temporal correlation information to generate final chroma quantization parameter offsets. In other examples, the initial chroma quantization parameter offsets are provided without temporal correlation based adjustments. For example, the initial chroma quantization parameter offsets as discussed herein may be characterized as final chroma quantization parameter offsets or chroma quantization parameter offsets or the like and they may be used to encode video sequence and provided in the bitstream for decode operations.

Processing may continue at decision operation 507, where a determination may be made as to whether a temporal correlation based adjustment is to be made to the chroma quantization parameter offset generated at operation 506. If not, processing may continue at decision operation 510 as discussed below.

If so, processing continue at operation 508, where one or more temporal correlation vales and/or other temporal information may be determined for the video sequence. The temporal correlation values and/or other temporal information may be determined using any suitable technique or techniques. For example, the temporal correlation values may include statistics obtained by motion estimation on down-sampled video 121, a ratio of a number of blocks having a small motion vector to the number of total blocks a picture, or the like.

Processing may continue at operation 509, where the initial chroma quantization parameter offset determined at operation 506 is adjusted based on the temporal correlation value or values determined at operation 508. The initial chroma quantization parameter offset may be adjusted using any suitable technique or techniques. In an embodiment, the temporal correlation value or values may be used to determine whether the video has strong temporal correlation or weak temporal correlation (or undetermined temporal correlation). If the video is determined to have strong temporal correlation, the chroma quantization parameter offset of the current picture selected at operation 503 is adjusted such that if the current picture is a high quality priority picture (e.g., high hierarchical level picture), the chroma quantization parameter offset is reduced (e.g., a negative adjustment is made) and, if the current picture is a low quality priority picture (e.g., low hierarchical level pictures), the chroma quantization parameter offset is increased (e.g., a positive adjustment is made). If the video is determined to have weak temporal correlation, the chroma quantization parameter offset of the current picture selected at operation 503 is adjusted such that if the current picture is a low quality priority picture (e.g., low hierarchical level picture), the chroma quantization parameter offset is reduced (e.g., a negative adjustment is made) and, if the current picture is a high quality priority picture (e.g., high hierarchical level pictures), the chroma quantization parameter offset is increased (e.g., a positive adjustment is made). Such adjustments may be applied for two, three, four, or more level hierarchical coding structures such that no change is made to medium, medium-low, medium-high, or the like quality priority pictures.

Processing may continue at decision operation 510, where a determination may be made as to whether the picture selected at operation 503 is the last picture to be coded. If so, processing may end at operation 511. If not, processing may continue at operation 503 where a subsequent picture in the video sequence may be selected for coding and further processing as discussed herein may be performed. Furthermore, although not shown in FIG. 5, the pictures selected at operation 503 are encoded based the chroma quantization parameter offset and both the encoded pictures and the chroma quantization parameter offsets are coded into a bitstream via entropy encoding techniques or the like. Such coding may be performed after all pictures of a sequence are processed, after a particular number of pictures are processed, in a real-time manner, or the like.

As discussed, optional temporal correlation based adjustments may be made to initial quantization parameter offsets.

Figure 6:
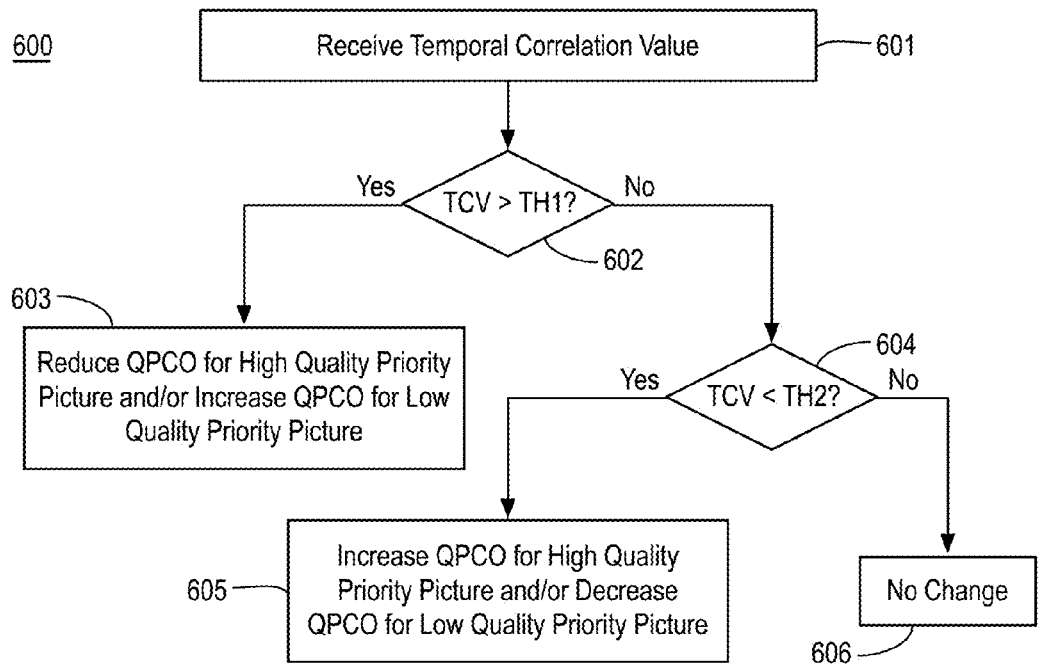
FIG. 6 is a flow diagram illustrating an example process for adjusting quantization parameter offsets based on temporal correlation.

FIG. 6 is a flow diagram illustrating an example process 600 for adjusting quantization parameter offsets based on temporal correlation, arranged in accordance with at least some implementations of the present disclosure. Process 600 may include one or more operations 601-606 as illustrated in FIG. 6. Process 600 may be performed by a device (e.g., system 100) to adjust quantization parameter offsets based on temporal correlation. For example, process 600 may be implemented at operation 509 of process 500.

Process 600 may begin at operation 601, where one or more temporal correlation values may be received for a picture of a video sequence. The temporal correlation value or values may be any temporal correlation information discussed herein. In the context of process 600, a single temporal correlation value may determined for a video sequence and/or for a current picture of the video sequence. For example, the temporal correlation value may be a value indicative of temporal correlation that has been attained or update through the current picture of the video sequence.

Processing may continue at decision operation 602, where a determination may be made as to whether the temporal correlation value satisfies a threshold (TH1) indicative of the video sequence, or a portion thereof, having strong temporal correlation. The threshold may be any suitable threshold based on the measurement of temporal correlation used. If strong temporal correlation is detected, processing continues at operation 603, where the chroma quantization parameter offset is reduced for a high quality priority picture or increased for a low quality priority picture as discussed herein.

If strong temporal correlation is not detected, processing continues at decision operation 604, where a determination may be made as to whether the temporal correlation value satisfies a threshold (TH2) indicative of the video sequence, or a portion thereof, having weak temporal correlation. The threshold may be any suitable threshold based on the measurement of temporal correlation used. Furthermore, the thresholds at operations 602 and 604 may be the same (such that all temporal correlation values satisfy either weak or strong temporal correlation) or different (such that some temporal correlation values have an undetermined temporal correlation).

If weak temporal correlation is detected, processing continues at operation 605, where the chroma quantization parameter offset is increased for a high quality priority picture or decreased for a low quality priority picture as discussed herein. If weak temporal correlation is not detected, processing continues at decision operation 606, where no change to chroma quantization parameter offsets are made.

As discussed herein, in some embodiments, independent chroma quantization parameter offset adjustments may be made to different color channels for pictures of a video sequence.

Figure 7:
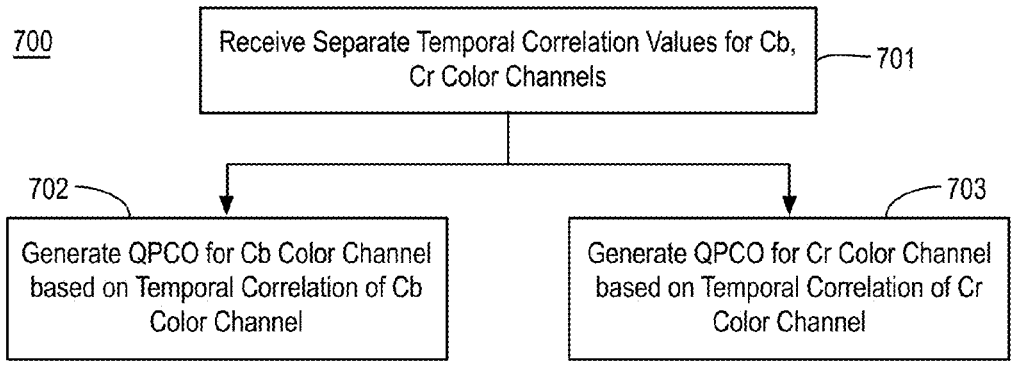
FIG. 7 is a flow diagram illustrating an example process for generating color channel independent quantization parameter offsets based on temporal correlation.

FIG. 7 is a flow diagram illustrating an example process 700 for generating color channel independent quantization parameter offsets based on temporal correlation, arranged in accordance with at least some implementations of the present disclosure. Process 700 may include one or more operations 701-703 as illustrated in FIG. 7. Process 700 may be performed by a device (e.g., system 100) to generate color channel independent quantization parameter offsets based on temporal correlation. For example, process 700 may be implemented at operation 509 of process 500.

Process 700 may begin at operation 701, where separate temporal correlation values may be received for a picture of a video sequence. For example, temporal correlation may be performed independently on first and second color channels (e.g., Cb, Cr) such that separate and color channel independent temporal correlation values are received.

Processing may continue at operations 702 and 703 where independent color channel based quantization parameter offsets are determined. Such independent color channel based chroma quantization parameter offsets may be implemented by adjustments to an initial chroma quantization parameter offset or the like.

For example, at operation 702, a chroma quantization parameter offset is generated for a first (e.g., Cb) color channel based on the temporal correlation of the first (e.g., Cb) color channel. The adjustment may be made using any suitable technique or techniques discussed herein such as those used in process 600 or the like. For example, if the first color channel is determined to have strong temporal correlation, the first channel chroma quantization parameter offset for the current picture selected is adjusted such that if the current picture is a high quality priority picture (e.g., high hierarchical level picture), the first channel chroma quantization parameter offset is reduced (e.g., a negative adjustment is made) and, if the current picture is a low quality priority picture (e.g., low hierarchical level pictures), the first channel chroma quantization parameter offset is increased (e.g., a positive adjustment is made). If the first color channel is determined to have weak temporal correlation, the first channel chroma quantization parameter offset for the current picture selected is adjusted such that if the current picture is a high quality priority picture (e.g., high hierarchical level picture), the first channel chroma quantization parameter offset is increased (e.g., a positive adjustment is made) and, if the current picture is a low quality priority picture (e.g., low hierarchical level pictures), the first channel chroma quantization parameter offset is reduced (e.g., a negative adjustment is made).

Similarly, at operation 703, a chroma quantization parameter offset is generated for a second (e.g., Cr) color channel based on the temporal correlation of the second (e.g., Cr) color channel. The adjustment may be made using any suitable technique or techniques discussed herein such as those used in process 600 or the like. For example, if the second color channel is determined to have strong temporal correlation, the second channel chroma quantization parameter offset for the current picture selected is adjusted such that if the current picture is a high quality priority picture (e.g., high hierarchical level picture), the second channel chroma quantization parameter offset is reduced (e.g., a negative adjustment is made) and, if the current picture is a low quality priority picture (e.g., low hierarchical level pictures), the second channel chroma quantization parameter offset is increased (e.g., a positive adjustment is made). If the second color channel is determined to have weak temporal correlation, the second channel chroma quantization parameter offset for the current picture selected is adjusted such that if the current picture is a high quality priority picture (e.g., high hierarchical level picture), the second channel chroma quantization parameter offset is increased (e.g., a positive adjustment is made) and, if the current picture is a low quality priority picture (e.g., low hierarchical level pictures), the second channel chroma quantization parameter offset is reduced (e.g., a negative adjustment is made).

Using the techniques discussed in process 700, color channel independent temporal correlation based chroma quantization parameter offset adjustments may be made. For example, different color channels may have different temporal correlations even for the same pictures of a video sequence such that color channel independent temporal correlation based chroma quantization parameter offset adjustments may be advantageous.

Figure 8:
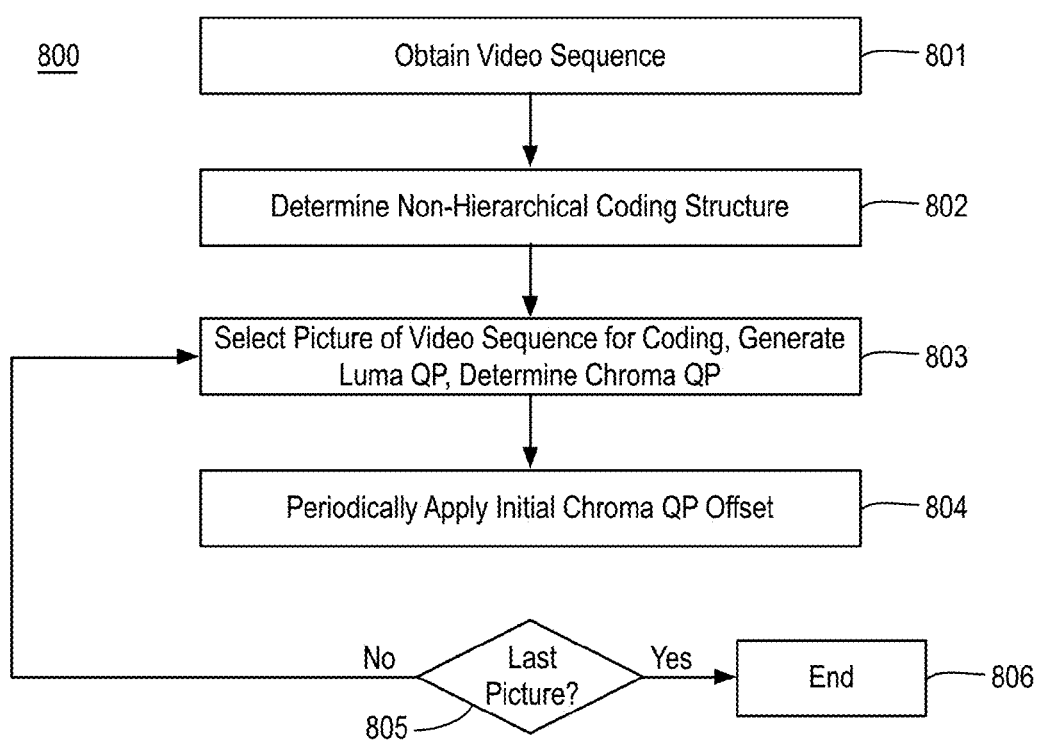
FIG. 8 is a flow diagram illustrating an example process for video coding including selection of chroma quantization parameter offsets for video having a non-hierarchical coding structure.

FIG. 8 is a flow diagram illustrating an example process 800 for video coding including selection of chroma quantization parameter offsets for video having a non-hierarchical coding structure, arranged in accordance with at least some implementations of the present disclosure. Process 800 may include one or more 801-806 as illustrated in FIG. 8. Process 800 may be performed by a device (e.g., system 100 or any other system or device discussed herein) to code a video sequence. Process 800 may be performed at a video sequence level or the like and process 800 may be repeated for any number of video sequences or the like.

Process 800 may begin at operation 801, where a video sequence may be obtained. The video sequence may be obtained using any suitable technique or techniques. In an embodiment, the video sequence may be received by a system such as system 100 for encode processing. For example, an application or user may evoke system 100 to provide video coding and the evocation may include the video sequence. In another embodiment, a camera and/or video preprocessing circuitry or the like may provide a video sequence for encode.

Processing may continue at operation 802, where a non-hierarchical coding structure is determined for the video sequence (e.g., for pictures of the video sequence) obtained at operation 801. The non-hierarchical coding structure may be determined using any suitable technique or techniques. In an embodiment, the non-hierarchical coding structure is received as a selection by an application or a user that is evoking a system to provide video coding. For example, the non-hierarchical coding structure may be received as a parameter selection. In an embodiment, the non-hierarchical coding structure is a default coding structure. As discussed herein, the non-hierarchical coding structure may provide no ranking for pictures (or a subset of pictures such as inter pictures) of the video sequence.

Processing may continue at operation 803, where a picture of the video sequence is selected for coding, a rate control based luma quantization parameter is generated for the picture, and a chroma quantization parameter or chroma quantization parameters may be determined for the picture. For example, pictures of the video sequence may be processed in an encode order that may match or differ from the temporal order of the pictures of the video sequence. The luma quantization parameter may be generated using any suitable technique or techniques such as rate distortion optimization techniques or the like. Furthermore, the chroma quantization parameter(s) may be generated for the picture based on applying a look up table to the luma quantization parameter or using similar techniques.

Processing may continue at operation 804, where an initial chroma quantization parameter offset is generated and applied for the picture based on a periodic insertion of a chroma quantization parameter offset or the like. For example, for a non-hierarchal video sequence, chroma quantization parameter offsets that reduce the operative chroma quantization parameter may be applied or inserted periodically in pictures processed by process 800. Based on the location of the current picture in the sequence, a chroma quantization parameter offset (e.g., a negative offset) may be applied. For example, if a chroma quantization parameter offset is applied every fourth picture, a determination may be made as to whether the current picture is a chroma quantization parameter offset picture (e.g., a first, fifth, ninth, etc. picture or the like) and, if so, a chroma quantization parameter offset is applied for the current picture. If not, no chroma quantization parameter offset is applied for the current picture.

For example, for a non-hierarchical coding structure, a chroma quantization parameter offset may be −1 for every Nth picture. If the current picture is an Nth picture, the offset is applied. For example, the offset may be applied every other, every third, every fourth or every fifth picture. Although discussed with respect to an offset of −1 any suitable offset such as −2 or the like may be used. For example, if a non-hierarchical coding structure video sequence has a −1 chroma quantization parameter offset applied every fourth picture, an initial chroma quantization parameter offsets may be provided (e.g., in a slice header of a bitstream) with the following pattern: [−1, 0, 0, 0, −1, 0, 0, 0 . . . ].

Processing may continue at decision operation 805, where a determination may be made as to whether the picture selected at operation 803 is the last picture to be coded. If so, processing may end at operation 806. If not, processing may continue at operation 803 where a subsequent picture in the video sequence may be selected for coding and further processing as discussed herein may be performed. Furthermore, although not shown in FIG. 8, the pictures selected at operation 803 are encoded based the chroma quantization parameter offset and both the encoded pictures and the chroma quantization parameter offsets are coded into a bitstream via entropy encoding techniques or the like. Such coding may be performed after all pictures of a sequence are processed, after a particular number of pictures are processed, in a real-time manner, or the like.

Figure 9:
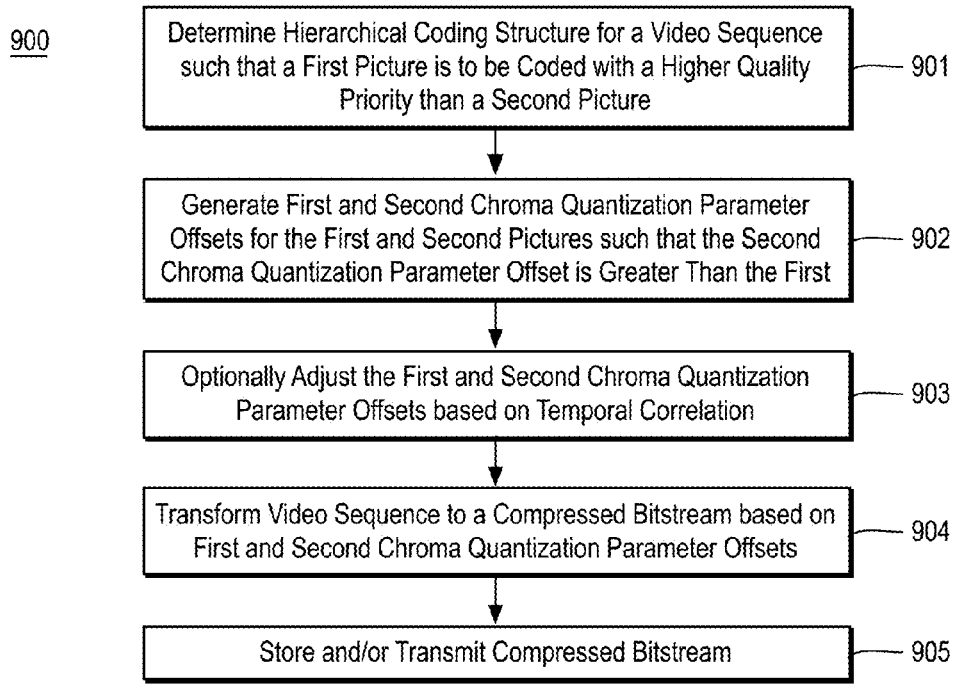
FIG. 9 is a flow diagram illustrating an example process for video coding including selection of chroma quantization parameter offsets.

FIG. 9 is a flow diagram illustrating an example process 900 for video coding including selection of chroma quantization parameter offsets, arranged in accordance with at least some implementations of the present disclosure. Process 900 may include one or more operations 901-905 as illustrated in FIG. 9. Process 900 may form at least part of a video coding process. By way of non-limiting example, process 900 may form at least part of a video coding process as performed by any device or system as discussed herein such as system 100. Furthermore, process 900 will be described herein with reference to system 1000 of FIG. 10.

Figure 10:
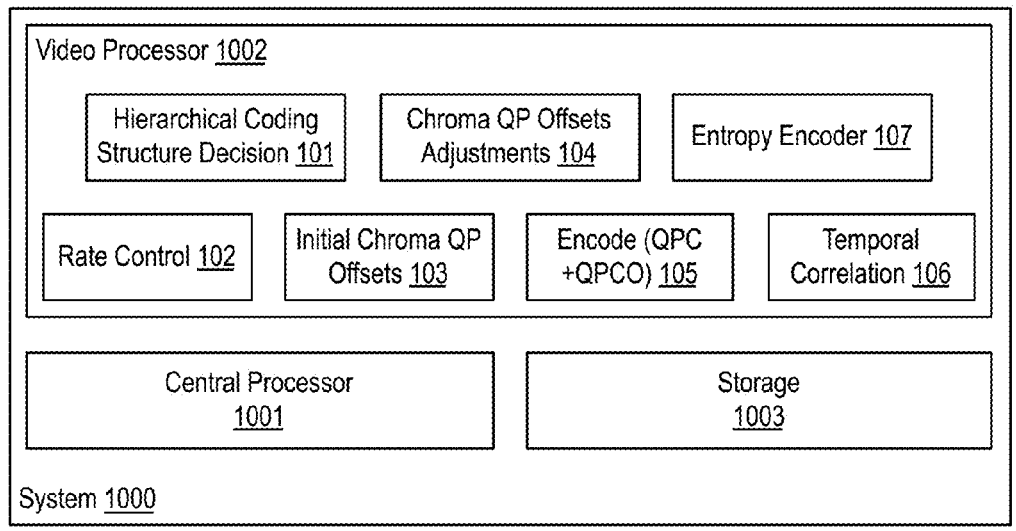
FIG. 10 is an illustrative diagram of an example system for video coding including selection of chroma quantization parameter offsets.

FIG. 10 is an illustrative diagram of an example system 1000 for video coding including selection of chroma quantization parameter offsets, arranged in accordance with at least some implementations of the present disclosure. As shown in FIG. 10, system 1000 may include central processor 1001, a video processor 1002, and a storage 1003 (e.g., electronic storage, computer storage, computer memory, or the like). Also as shown, video processor 1002 may include hierarchical coding structure decision module 101, rate control module 102, initial chroma quantization parameter offsets module 103, chroma quantization parameter offsets adjustments module 104, encode module 105, temporal correlation module 106, and entropy encoder 107. In the example of system 1000, storage 1003 may store video data or related content such as video, video data, video sequences, pictures, picture data, group of picture data, picture type data, quantization parameters (luma and or chroma), temporal correlation data, chroma quantization parameter offset or adjustment factors, encoded picture data, bitstream data, control data, and/or any other data as discussed herein.

As shown, in some examples, hierarchical coding structure decision module 101, rate control module 102, initial chroma quantization parameter offsets module 103, chroma quantization parameter offsets adjustments module 104, encode module 105, temporal correlation module 106, and entropy encoder 107 may be implemented via video processor 1002. In other examples, one or more or portions of hierarchical coding structure decision module 101, rate control module 102, initial chroma quantization parameter offsets module 103, chroma quantization parameter offsets adjustments module 104, encode module 105, temporal correlation module 106, and entropy encoder 107 may be implemented via central processor 1001 or another processing unit such as an image processor, a graphics processor, or the like.

Video processor 1002 may include any number and type of video, image, or graphics processing units that may provide the operations as discussed herein. Such operations may be implemented via software or hardware or a combination thereof. For example, video processor 1002 may include circuitry dedicated to manipulate video, pictures, picture data, or the like obtained from storage 1003. Central processor 1001 may include any number and type of processing units or modules that may provide control and other high level functions for system 1000 and/or provide any operations as discussed herein. Storage 1003 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, storage 1003 may be implemented by cache memory.

In an embodiment, one or more or portions of hierarchical coding structure decision module 101, rate control module 102, initial chroma quantization parameter offsets module 103, chroma quantization parameter offsets adjustments module 104, encode module 105, temporal correlation module 106, and entropy encoder 107 may be implemented via an execution unit (EU). The EU may include, for example, programmable logic or circuitry such as a logic core or cores that may provide a wide array of programmable logic functions. In an embodiment, one or more or portions of hierarchical coding structure decision module 101, rate control module 102, initial chroma quantization parameter offsets module 103, chroma quantization parameter offsets adjustments module 104, encode module 105, temporal correlation module 106, and entropy encoder 107 may be implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 9, process 900 may begin at operation 901, where a hierarchical coding structure is determined for pictures of a video sequence to be coded such that the hierarchical coding structure indicates a first picture of the video sequence is to be coded with a higher quality priority than a second picture of the video sequence. In an embodiment, hierarchical coding structure decision module 101 as implemented via video processor 1002 determines the hierarchical coding structure. The hierarchical coding structure may be a two level, three level, or four level hierarchical coding structure for example. In an embodiment, the hierarchical coding structure further indicates a third picture of the video sequence is to be coded with a higher quality priority than the second picture and a lower quality priority than the first picture.

Processing may continue at operation 902, where a first chroma quantization parameter offset is generated for the first picture and a second chroma quantization parameter offset is generated for the second picture such that the second chroma quantization parameter offset is greater than the first chroma quantization parameter offset in response to the first picture having a higher quality priority than the second picture. In examples where the hierarchical coding structure further indicates a third picture of the video sequence is to be coded with a higher quality priority than the second picture and a lower quality priority than the first picture, a third chroma quantization parameter offset is generated for the third picture such that the third chroma quantization parameter offset is greater than the first chroma quantization parameter offset and less than the second chroma quantization parameter offset in response to the third picture having a higher quality priority than the second picture and a lower quality priority than the first picture. Similarly, chroma quantization parameter offsets may be generated for other frames of higher level hierarchies as discussed herein. In an embodiment, initial chroma quantization parameter offsets module 103 as implemented via video processor 1002 generates the first, second, and, optionally, third chroma quantization parameter offsets (and/or additional) offsets as needed.

Processing may continue at operation 903, where a determination may be made as to whether the video sequence has a strong or weak temporal correlation. If the video sequence has a strong temporal correlation, prior to the transform operation 904 and in response to the video sequence having a strong temporal correlation, the first chroma quantization parameter offset may be reduced and/or the second chroma quantization parameter offset may be increased. If the video sequence has a weak temporal correlation, prior to the transform operation 904 and in response to the video sequence having a weak temporal correlation, the first chroma quantization parameter offset may be increased and/or the second chroma quantization parameter offset may be reduced.

In an embodiment, a temporal correlation value corresponding to at least a portion of the video sequence including the first and second pictures is determined, a determination is made that the temporal correlation value satisfies a threshold indicative of the portion of the video sequence having a strong temporal correlation, and, prior to transforming the video sequence and in response to the portion of the video sequence having a strong temporal correlation, the first chroma quantization parameter offset is reduced. In an embodiment, prior to transforming the video sequence and in response to the portion of the video sequence having a strong temporal correlation, the second chroma quantization parameter offset is increased.

In an embodiment, a temporal correlation value corresponding to at least a portion of the video sequence including the first and second pictures is determined, a determination is made that the temporal correlation value does not satisfy a threshold indicative of the portion of the video sequence having a strong temporal correlation and/or a determination is made that the temporal correlation value satisfies a threshold indicative of the portion of the video sequence having a weak temporal correlation, and, prior to transforming the video sequence and in response to the portion of the video sequence having a strong temporal correlation, the first chroma quantization parameter offset is increased and/or, prior to transforming the video sequence and in response to the portion of the video sequence having a strong temporal correlation, the second chroma quantization parameter offset is decreased.

In some embodiments, independent chroma quantization parameter offset adjustments are made for different color channels of the video sequence. In an embodiment, the video sequence comprises a luma channel, a first color channel, and a second color channel, and, using only the first color channel of the video sequence, a first color channel temporal correlation value corresponding to at least a portion of the video sequence including the first and second pictures is determined. Furthermore, using only the second color channel of the video sequence, a second color channel temporal correlation value corresponding to at least the portion of the video sequence is determined. Then, a first color channel chroma quantization parameter offset is generated based on the first color channel temporal correlation value and a second color channel chroma quantization parameter offset, different than the first color channel chroma quantization parameter offset, is generated based on the second color channel temporal correlation value. For example, transforming the video sequence, as discussed with respect to operation 904, to the compressed bitstream may include coding the first color channel of the first picture using the first color channel chroma quantization parameter offset and the second color channel of the first picture using the second color channel chroma quantization parameter offset.

In an embodiment, generating the first color channel chroma quantization parameter offset includes determining the first color channel temporal correlation value satisfies a threshold indicative of strong temporal correlation and reducing, in response to the first color channel having a strong temporal correlation, the first chroma quantization parameter offset to generate the first color channel chroma quantization parameter offset. In an embodiment, generating the second color channel chroma quantization parameter offset includes determining the second color channel temporal correlation value does not satisfy the threshold indicative of strong temporal correlation and increasing, in response to the second color channel having a weak temporal correlation, the second chroma quantization parameter offset to generate the second color channel chroma quantization parameter offset.

In an embodiment, regarding operation 903, temporal correlation module as implemented via video processor 1002 determines the temporal correlation value and chroma quantization parameter offsets adjustments module 104 as implemented via video processor 1002 increases or decreases the chroma quantization parameter offsets.

As discussed herein, in some embodiments, periodic chroma quantization parameter offsets may be applied to non-hierarchical video sequences. In an embodiment, process 900 may further include determining a second video sequence is to be coded with a non-hierarchical coding structure and periodically adjusting a chroma quantization parameter offset for pictures of the second video sequence. In an embodiment, periodically adjusting the chroma quantization parameter offset comprises reducing the chroma quantization parameter offset for every Nth (e.g., second, third, fourth, or the like) picture of the second video sequence.

Processing may continue at operation 904, where the video sequence is transformed to a compressed bitstream based in part on compressing the first picture based on the first chroma quantization parameter offset and the second picture based on the second chroma quantization parameter offset. In an embodiment, encode module 105 module and/or entropy encoder 107 as implemented via video processor 1002 encodes the video sequence including the first and second pictures to generate a bitstream. In an embodiment, coding the first picture includes translating a luma quantization parameter corresponding to the first picture to a chroma quantization parameter corresponding to the first picture using a look-up table. For example, the luma quantization parameter may be generated based on a rate control optimization or the like. Then, the chroma quantization parameter is adjusted by the first chroma quantization parameter offset to generate an adjusted chroma quantization parameter. For example, transforming the video sequence to the compressed bitstream includes quantizing transform coefficients of the first picture using the adjusted chroma quantization parameter. Similarly, the second picture (and other pictures) of the video sequence may be encoded based on luma quantization parameters generated using rate control optimization, chroma quantization parameters determined using a look up table with the luma quantization parameters as inputs, and quantizing transform coefficients (e.g., transform coefficients of chroma residuals) using the adjusted chroma quantization parameter (e.g., the chroma quantization parameters determined using the look up adjusted by chroma quantization parameter offsets with or without temporal adjustments). Furthermore, the compressed bitstream may include a picture level, a slice level parameter set, header data, or the like including the first and second chroma quantization parameter offsets and/or any other chroma quantization parameter offsets.

Processing may continue at operation 905, where the bitstream may be stored (e.g., to storage 1003), transmitted to another device (e.g., via an antenna and/or communications hardware, not shown in FIG. 10), or the like. For example, the bitstream may be stored and/or transmitted for future decode and presentment to a user. The bitstream generated at operation 904 and stored and/or transmitted at operation 905 may be any suitable bitstream such as a standards compliant bitstream. For example, the bitstream may be an advanced video coding (AVC) compliant bitstream, a high efficiency video coding (HEVC) compliant bitstream, a VP8 compliant bitstream, a VP9 compliant bitstream, or the like.

Process 900 may be repeated any number of times either in series or in parallel for any number video sequences or the like. As discussed, process 900 may provide for video encoding including selection of chroma quantization parameter offsets. For example, the discussed techniques for video coding may provide chroma quantization parameter offset selection and control to achieve improved compression efficiency and video quality.

Various components of the systems described herein may be implemented in software, firmware, and/or hardware and/or any combination thereof. For example, various components of the systems or devices discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 11:
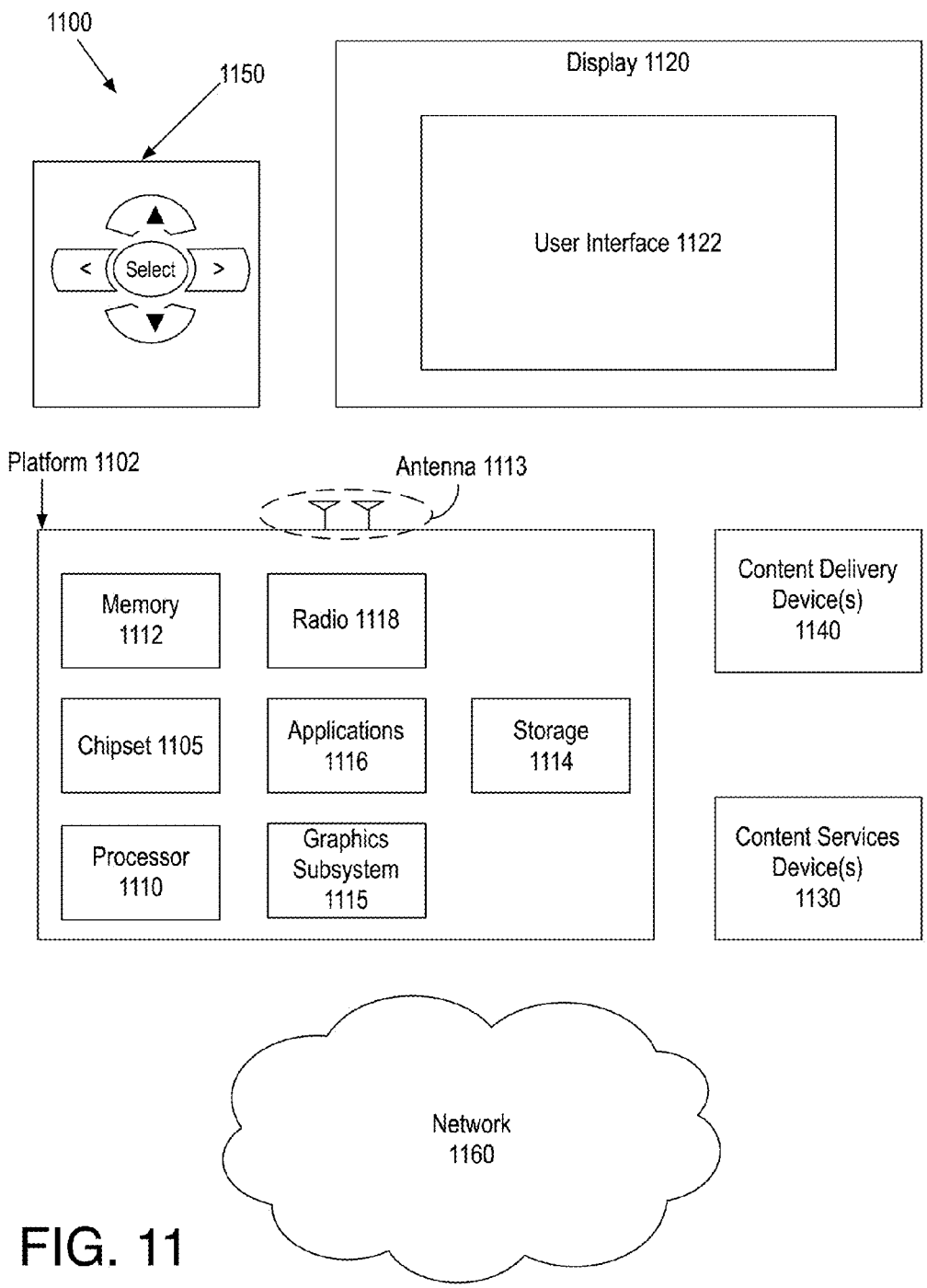
FIG. 11 is an illustrative diagram of an example system.

FIG. 11 is an illustrative diagram of an example system 1100, arranged in accordance with at least some implementations of the present disclosure. In various implementations, system 1100 may be a mobile system although system 1100 is not limited to this context. For example, system 1100 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1100 includes a platform 1102 coupled to a display 1120. Platform 1102 may receive content from a content device such as content services device(s) 1130 or content delivery device(s) 1140 or other similar content sources. A navigation controller 1150 including one or more navigation features may be used to interact with, for example, platform 1102 and/or display 1120. Each of these components is described in greater detail below.

In various implementations, platform 1102 may include any combination of a chipset 1105, processor 1110, memory 1112, antenna 1113, storage 1114, graphics subsystem 1115, applications 1116 and/or radio 1118. Chipset 1105 may provide intercommunication among processor 1110, memory 1112, storage 1114, graphics subsystem 1115, applications 1116 and/or radio 1118. For example, chipset 1105 may include a storage adapter (not depicted) capable of providing intercommunication with storage 1114.

Processor 1110 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1110 may be dual-core processor(s), dual-core mobile processor(s), and so forth.

Memory 1112 may be implemented as a volatile memory device such as, but not limited to, a Random Access Memory (RAM), Dynamic Random Access Memory (DRAM), or Static RAM (SRAM).

Storage 1114 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1114 may include technology to increase the storage performance enhanced protection for valuable digital media when multiple hard drives are included, for example.

Graphics subsystem 1115 may perform processing of images such as still or video for display. Graphics subsystem 1115 may be a graphics processing unit (GPU) or a visual processing unit (VPU), for example. An analog or digital interface may be used to communicatively couple graphics subsystem 1115 and display 1120. For example, the interface may be any of a High-Definition Multimedia Interface, DisplayPort, wireless HDMI, and/or wireless HD compliant techniques. Graphics subsystem 1115 may be integrated into processor 1110 or chipset 1105. In some implementations, graphics subsystem 1115 may be a stand-alone device communicatively coupled to chipset 1105.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1118 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1118 may operate in accordance with one or more applicable standards in any version.

In various implementations, display 1120 may include any television type monitor or display. Display 1120 may include, for example, a computer display screen, touch screen display, video monitor, television-like device, and/or a television. Display 1120 may be digital and/or analog. In various implementations, display 1120 may be a holographic display. Also, display 1120 may be a transparent surface that may receive a visual projection. Such projections may convey various forms of information, images, and/or objects. For example, such projections may be a visual overlay for a mobile augmented reality (MAR) application. Under the control of one or more software applications 1116, platform 1102 may display user interface 1122 on display 1120.

In various implementations, content services device(s) 1130 may be hosted by any national, international and/or independent service and thus accessible to platform 1102 via the Internet, for example. Content services device(s) 1130 may be coupled to platform 1102 and/or to display 1120. Platform 1102 and/or content services device(s) 1130 may be coupled to a network 1160 to communicate (e.g., send and/or receive) media information to and from network 1160. Content delivery device(s) 1140 also may be coupled to platform 1102 and/or to display 1120.

In various implementations, content services device(s) 1130 may include a cable television box, personal computer, network, telephone, Internet enabled devices or appliance capable of delivering digital information and/or content, and any other similar device capable of uni-directionally or bi-directionally communicating content between content providers and platform 1102 and/display 1120, via network 1160 or directly. It will be appreciated that the content may be communicated uni-directionally and/or bi-directionally to and from any one of the components in system 1100 and a content provider via network 1160. Examples of content may include any media information including, for example, video, music, medical and gaming information, and so forth.

Content services device(s) 1130 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1102 may receive control signals from navigation controller 1150 having one or more navigation features. The navigation features of may be used to interact with user interface 1122, for example. In various embodiments, navigation may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of may be replicated on a display (e.g., display 1120) by movements of a pointer, cursor, focus ring, or other visual indicators displayed on the display. For example, under the control of software applications 1116, the navigation features located on navigation may be mapped to virtual navigation features displayed on user interface 1122, for example. In various embodiments, may not be a separate component but may be integrated into platform 1102 and/or display 1120. The present disclosure, however, is not limited to the elements or in the context shown or described herein.

In various implementations, drivers (not shown) may include technology to enable users to instantly turn on and off platform 1102 like a television with the touch of a button after initial boot-up, when enabled, for example. Program logic may allow platform 1102 to stream content to media adaptors or other content services device(s) 1130 or content delivery device(s) 1140 even when the platform is turned "off." In addition, chipset 1105 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 1100 may be integrated. For example, platform 1102 and content services device(s) 1130 may be integrated, or platform 1102 and content delivery device(s) 1140 may be integrated, or platform 1102, content services device(s) 1130, and content delivery device(s) 1140 may be integrated, for example. In various embodiments, platform 1102 and display 1120 may be an integrated unit. Display 1120 and content service device(s) 1130 may be integrated, or display 1120 and content delivery device(s) 1140 may be integrated, for example. These examples are not meant to limit the present disclosure.

In various embodiments, system 1100 may be implemented as a wireless system, a wired system, or a combination of both. When implemented as a wireless system, system 1100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1102 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 11.

Figure 12:
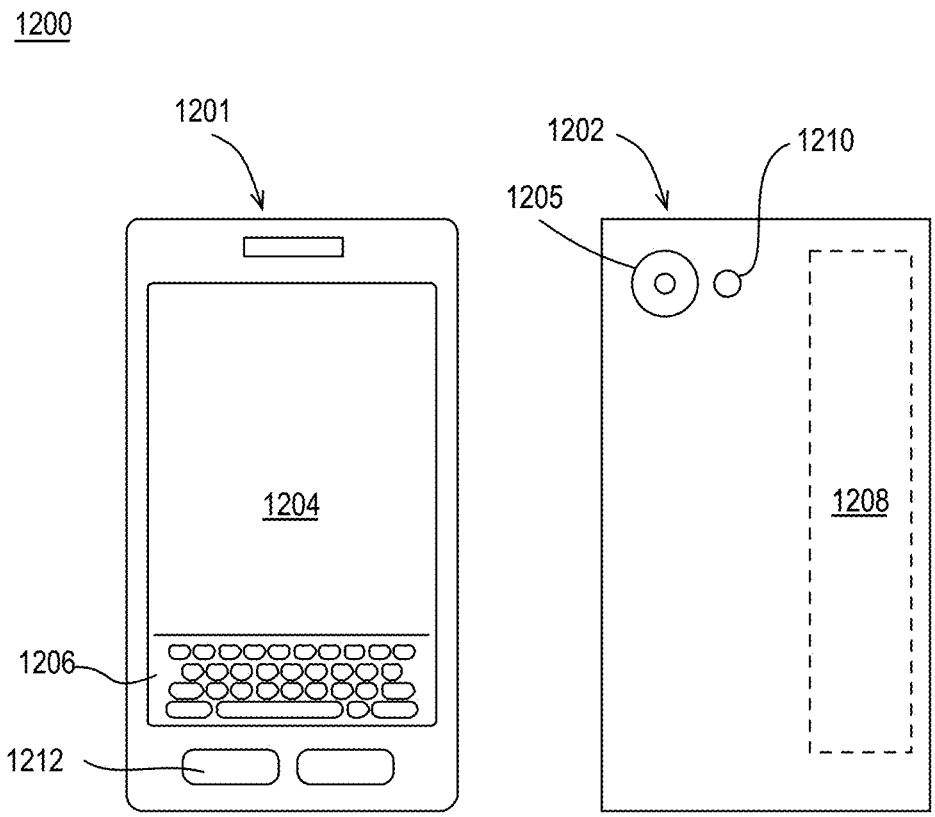
FIG. 12 illustrates an example device, all arranged in accordance with at least some implementations of the present disclosure.

As described above, system 1100 may be embodied in varying physical styles or form factors. FIG. 12 illustrates an example small form factor device 1200, arranged in accordance with at least some implementations of the present disclosure. In some examples, system 1100 may be implemented via device 1200. In other examples, system 100 or portions thereof may be implemented via device 1200. In various embodiments, for example, device 1200 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 12, device 1200 may include a housing with a front 1201 and a back 1202. Device 1200 includes a display 1204, an input/output (I/O) device 1206, and an integrated antenna 1208. Device 1200 also may include navigation features 1212. I/O device 1206 may include any suitable I/O device for entering information into a mobile computing device. Examples for I/O device 1206 may include an alphanumeric keyboard, a numeric keypad, a touch pad, input keys, buttons, switches, microphones, speakers, voice recognition device and software, and so forth. Information also may be entered into device 1200 by way of microphone (not shown), or may be digitized by a voice recognition device. As shown, device 1200 may include a camera 1205 (e.g., including a lens, an aperture, and an imaging sensor) and a flash 1210 integrated into back 1202 (or elsewhere) of device 1200. In other examples, camera 1205 and flash 1210 may be integrated into front 1201 of device 1200 or both front and back cameras may be provided. Camera 1205 and flash 1210 may be components of a camera module to originate image data processed into streaming video that is output to display 1204 and/or communicated remotely from device 1200 via antenna 1208 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following embodiments pertain to further embodiments.

In one or more first embodiments, a computer-implemented method for video coding includes determining a hierarchical coding structure for pictures of a video sequence to be coded, wherein the hierarchical coding structure indicates a first picture of the video sequence is to be coded with a higher quality priority than a second picture of the video sequence, generating a first chroma quantization parameter offset for the first picture and a second chroma quantization parameter offset for the second picture, wherein the second chroma quantization parameter offset is greater than or equal to the first chroma quantization parameter offset in response to the first picture having a higher quality priority than the second picture, and transforming the video sequence to a compressed bitstream based in part on compressing the first picture based on the first chroma quantization parameter offset and the second picture based on the second chroma quantization parameter offset.

Further to the first embodiments, the method further comprises determining a temporal correlation value corresponding to at least a portion of the video sequence including the first and second pictures, determining the temporal correlation value satisfies a threshold indicative of the portion of the video sequence having a strong temporal correlation, and reducing, prior to transforming the video sequence and in response to the portion of the video sequence having a strong temporal correlation, the first chroma quantization parameter offset.

Further to the first embodiments, the method further comprises determining a temporal correlation value corresponding to at least a portion of the video sequence including the first and second pictures, determining the temporal correlation value satisfies a threshold indicative of the portion of the video sequence having a strong temporal correlation, reducing, prior to transforming the video sequence and in response to the portion of the video sequence having a strong temporal correlation, the first chroma quantization parameter offset, and increasing, prior to transforming the video sequence and in response to the portion of the video sequence having a strong temporal correlation, the second chroma quantization parameter offset.

Further to the first embodiments, the method further comprises determining a temporal correlation value corresponding to at least a portion of the video sequence including the first and second pictures, determining the temporal correlation value does not satisfy a threshold indicative of the portion of the video sequence having a strong temporal correlation, increasing, prior to transforming the video sequence and in response to the portion of the video sequence having a weak temporal correlation, the first chroma quantization parameter offset, and decreasing, prior to transforming the video sequence and in response to the portion of the video sequence having a weak temporal correlation, the second chroma quantization parameter offset.

Further to the first embodiments, the video sequence comprises a luma channel, a first color channel, and a second color channel and the method further comprises determining, using only the first color channel of the video sequence, a first color channel temporal correlation value corresponding to at least a portion of the video sequence including the first and second pictures, determining, using only the second color channel of the video sequence, a second color channel temporal correlation value corresponding to at least the portion of the video sequence, and generating a first color channel chroma quantization parameter offset based on the first color channel temporal correlation value and a second color channel chroma quantization parameter offset, different than the first color channel chroma quantization parameter offset, based on the second color channel temporal correlation value, wherein transforming the video sequence to the compressed bitstream comprises coding the first color channel of the first picture using the first color channel chroma quantization parameter offset and the second color channel of the first picture using the second color channel chroma quantization parameter offset.

Further to the first embodiments, the video sequence comprises a luma channel, a first color channel, and a second color channel and the method further comprises determining, using only the first color channel of the video sequence, a first color channel temporal correlation value corresponding to at least a portion of the video sequence including the first and second pictures, determining, using only the second color channel of the video sequence, a second color channel temporal correlation value corresponding to at least the portion of the video sequence, and generating a first color channel chroma quantization parameter offset based on the first color channel temporal correlation value and a second color channel chroma quantization parameter offset, different than the first color channel chroma quantization parameter offset, based on the second color channel temporal correlation value, wherein transforming the video sequence to the compressed bitstream comprises coding the first color channel of the first picture using the first color channel chroma quantization parameter offset and the second color channel of the first picture using the second color channel chroma quantization parameter offset, wherein generating the first color channel chroma quantization parameter offset comprises determining the first color channel temporal correlation value satisfies a threshold indicative of strong temporal correlation and reducing, in response to the first color channel having a strong temporal correlation, the first chroma quantization parameter offset to generate the first color channel chroma quantization parameter offset.

Further to the first embodiments, the video sequence comprises a luma channel, a first color channel, and a second color channel and the method further comprises determining, using only the first color channel of the video sequence, a first color channel temporal correlation value corresponding to at least a portion of the video sequence including the first and second pictures, determining, using only the second color channel of the video sequence, a second color channel temporal correlation value corresponding to at least the portion of the video sequence, and generating a first color channel chroma quantization parameter offset based on the first color channel temporal correlation value and a second color channel chroma quantization parameter offset, different than the first color channel chroma quantization parameter offset, based on the second color channel temporal correlation value, wherein transforming the video sequence to the compressed bitstream comprises coding the first color channel of the first picture using the first color channel chroma quantization parameter offset and the second color channel of the first picture using the second color channel chroma quantization parameter offset, wherein generating the first color channel chroma quantization parameter offset comprises determining the first color channel temporal correlation value satisfies a threshold indicative of strong temporal correlation and reducing, in response to the first color channel having a strong temporal correlation, the first chroma quantization parameter offset to generate the first color channel chroma quantization parameter offset and generating the second color channel chroma quantization parameter offset comprises determining the second color channel temporal correlation value does not satisfy the threshold indicative of strong temporal correlation and increasing, in response to the second color channel having a weak temporal correlation, the second chroma quantization parameter offset to generate the second color channel chroma quantization parameter offset.

Further to the first embodiments, the hierarchical coding structure further indicates a third picture of the video sequence is to be coded with a higher quality priority than the second picture and a lower quality priority than the first picture and the method further comprises generating a third chroma quantization parameter offset for the third picture, wherein the third chroma quantization parameter offset is greater than or equal to the first chroma quantization parameter offset and less than or equal to the second chroma quantization parameter offset in response to the third picture having a higher quality priority than the second picture and a lower quality priority than the first picture.

Further to the first embodiments, the method further comprises determining a second video sequence is to be coded with a non-hierarchical coding structure and periodically adjusting a chroma quantization parameter offset for pictures of the second video sequence.

Further to the first embodiments, the method further comprises determining a second video sequence is to be coded with a non-hierarchical coding structure and periodically adjusting a chroma quantization parameter offset for pictures of the second video sequence, wherein periodically adjusting the chroma quantization parameter offset comprises reducing the chroma quantization parameter offset for every Nth picture of the second video sequence, wherein N is an integer greater than 1.

Further to the first embodiments, the method further comprises translating a luma quantization parameter corresponding to the first picture to a chroma quantization parameter corresponding to the first picture using a look-up table and adjusting the chroma quantization parameter by the first chroma quantization parameter offset to generate an adjusted chroma quantization parameter, wherein transforming the video sequence to the compressed bitstream comprises quantizing transform coefficients of the first picture using the adjusted chroma quantization parameter.

Further to the first embodiments, the compressed bitstream comprises a picture level or slice level parameter set including the first and second chroma quantization parameter offsets and the method further comprises at least one of storing the compressed bitstream to electronic storage or transmitting the compressed bitstream to a remote device.

In one or more second embodiments, system for video coding comprises a storage to store pictures of a video sequence and a processor coupled to the memory, the processor to determine a hierarchical coding structure for pictures of a video sequence to be coded, wherein the hierarchical coding structure indicates a first picture of the video sequence is to be coded with a higher quality priority than a second picture of the video sequence, to generate a first chroma quantization parameter offset for the first picture and a second chroma quantization parameter offset for the second picture, wherein the second chroma quantization parameter offset is greater than or equal to the first chroma quantization parameter offset in response to the first picture having a higher quality priority than the second picture, and to transform the video sequence to a compressed bitstream based in part on compressing the first picture based on the first chroma quantization parameter offset and the second picture based on the second chroma quantization parameter offset.

Further to the second embodiments, the processor is further to determine a temporal correlation value corresponding to at least a portion of the video sequence including the first and second pictures, to determine the temporal correlation value satisfies a threshold indicative of the portion of the video sequence having a strong temporal correlation, and to reduce, prior to transforming the video sequence and in response to the portion of the video sequence having a strong temporal correlation, the first chroma quantization parameter offset.

Further to the second embodiments, the processor is further to determine a temporal correlation value corresponding to at least a portion of the video sequence including the first and second pictures, to determine the temporal correlation value satisfies a threshold indicative of the portion of the video sequence having a strong temporal correlation, to reduce, prior to transforming the video sequence and in response to the portion of the video sequence having a strong temporal correlation, the first chroma quantization parameter offset, and to increase, prior to transforming the video sequence and in response to the portion of the video sequence having a strong temporal correlation, the second chroma quantization parameter offset.

Further to the second embodiments, the processor is further to determine a temporal correlation value corresponding to at least a portion of the video sequence including the first and second pictures, to determine the temporal correlation value does not satisfy a threshold indicative of the portion of the video sequence having a strong temporal correlation, to increase, prior to transforming the video sequence and in response to the portion of the video sequence having a weak temporal correlation, the first chroma quantization parameter offset, and to decrease, prior to transforming the video sequence and in response to the portion of the video sequence having a weak temporal correlation, the second chroma quantization parameter offset.

Further to the second embodiments, the video sequence comprises a luma channel, a first color channel, and a second color channel, and the processor is further to determine, using only the first color channel of the video sequence, a first color channel temporal correlation value corresponding to at least a portion of the video sequence including the first and second pictures, to determine, using only the second color channel of the video sequence, a second color channel temporal correlation value corresponding to at least the portion of the video sequence, and to generate a first color channel chroma quantization parameter offset based on the first color channel temporal correlation value and a second color channel chroma quantization parameter offset, different than the first color channel chroma quantization parameter offset, based on the second color channel temporal correlation value, wherein to transform the video sequence to the compressed bitstream comprises the processor to code the first color channel of the first picture using the first color channel chroma quantization parameter offset and the second color channel of the first picture using the second color channel chroma quantization parameter offset.

Further to the second embodiments, the video sequence comprises a luma channel, a first color channel, and a second color channel, and the processor is further to determine, using only the first color channel of the video sequence, a first color channel temporal correlation value corresponding to at least a portion of the video sequence including the first and second pictures, to determine, using only the second color channel of the video sequence, a second color channel temporal correlation value corresponding to at least the portion of the video sequence, and to generate a first color channel chroma quantization parameter offset based on the first color channel temporal correlation value and a second color channel chroma quantization parameter offset, different than the first color channel chroma quantization parameter offset, based on the second color channel temporal correlation value, wherein to transform the video sequence to the compressed bitstream comprises the processor to code the first color channel of the first picture using the first color channel chroma quantization parameter offset and the second color channel of the first picture using the second color channel chroma quantization parameter offset, wherein to generate the first color channel chroma quantization parameter offset comprises the processor to determine the first color channel temporal correlation value satisfies a threshold indicative of strong temporal correlation and to reduce, in response to the first color channel having a strong temporal correlation, the first chroma quantization parameter offset to generate the first color channel chroma quantization parameter offset.

Further to the second embodiments, the video sequence comprises a luma channel, a first color channel, and a second color channel, and the processor is further to determine, using only the first color channel of the video sequence, a first color channel temporal correlation value corresponding to at least a portion of the video sequence including the first and second pictures, to determine, using only the second color channel of the video sequence, a second color channel temporal correlation value corresponding to at least the portion of the video sequence, and to generate a first color channel chroma quantization parameter offset based on the first color channel temporal correlation value and a second color channel chroma quantization parameter offset, different than the first color channel chroma quantization parameter offset, based on the second color channel temporal correlation value, wherein to transform the video sequence to the compressed bitstream comprises the processor to code the first color channel of the first picture using the first color channel chroma quantization parameter offset and the second color channel of the first picture using the second color channel chroma quantization parameter offset, wherein to generate the first color channel chroma quantization parameter offset comprises the processor to determine the first color channel temporal correlation value satisfies a threshold indicative of strong temporal correlation and to reduce, in response to the first color channel having a strong temporal correlation, the first chroma quantization parameter offset to generate the first color channel chroma quantization parameter offset and wherein to generate the second color channel chroma quantization parameter offset comprises the processor to determine the second color channel temporal correlation value does not satisfy the threshold indicative of strong temporal correlation and to increase, in response to the second color channel having a weak temporal correlation, the second chroma quantization parameter offset to generate the second color channel chroma quantization parameter offset.

Further to the second embodiments, the hierarchical coding structure further indicates a third picture of the video sequence is to be coded with a higher quality priority than the second picture and a lower quality priority than the first picture, and the processor is further to generate a third chroma quantization parameter offset for the third picture, wherein the third chroma quantization parameter offset is greater than or equal to the first chroma quantization parameter offset and less than or equal to the second chroma quantization parameter offset in response to the third picture having a higher quality priority than the second picture and a lower quality priority than the first picture.

Further to the second embodiments, the processor is further to determine a second video sequence is to be coded with a non-hierarchical coding structure and to periodically adjust a chroma quantization parameter offset for pictures of the second video sequence.

Further to the second embodiments, the processor is further to determine a second video sequence is to be coded with a non-hierarchical coding structure and to periodically adjust a chroma quantization parameter offset for pictures of the second video sequence, wherein to periodically adjust the chroma quantization parameter offset comprises the processor to reduce the chroma quantization parameter offset for every Nth picture of the second video sequence, wherein N is an integer greater than 1.

Further to the second embodiments, the processor is further to translate a luma quantization parameter corresponding to the first picture to a chroma quantization parameter corresponding to the first picture using a look-up table and to adjust the chroma quantization parameter by the first chroma quantization parameter offset to generate an adjusted chroma quantization parameter, wherein to transform the video sequence to the compressed bitstream comprises the processor to quantize transform coefficients of the first picture using the adjusted chroma quantization parameter.

Further to the second embodiments, the compressed bitstream comprises a picture level or slice level parameter set including the first and second chroma quantization parameter offsets, and the processor is further to store the compressed bitstream to the storage or transmit the compressed bitstream to a remote device.

In one or more third embodiments, a system comprises means for determining a hierarchical coding structure for pictures of a video sequence to be coded, wherein the hierarchical coding structure indicates a first picture of the video sequence is to be coded with a higher quality priority than a second picture of the video sequence, means for generating a first chroma quantization parameter offset for the first picture and a second chroma quantization parameter offset for the second picture, wherein the second chroma quantization parameter offset is greater than or equal to the first chroma quantization parameter offset in response to the first picture having a higher quality priority than the second picture, and means for transforming the video sequence to a compressed bitstream based in part on compressing the first picture based on the first chroma quantization parameter offset and the second picture based on the second chroma quantization parameter offset.

Further to the third embodiments, the system further comprises means for determining a temporal correlation value corresponding to at least a portion of the video sequence including the first and second pictures, means for determining the temporal correlation value satisfies a threshold indicative of the portion of the video sequence having a strong temporal correlation, and means for reducing, prior to transforming the video sequence and in response to the portion of the video sequence having a strong temporal correlation, the first chroma quantization parameter offset.

Further to the third embodiments, the system further comprises means for determining a temporal correlation value corresponding to at least a portion of the video sequence including the first and second pictures, means for determining the temporal correlation value does not satisfy a threshold indicative of the portion of the video sequence having a strong temporal correlation, means for increasing, prior to transforming the video sequence and in response to the portion of the video sequence having a weak temporal correlation, the first chroma quantization parameter offset, and means for decreasing, prior to transforming the video sequence and in response to the portion of the video sequence having a weak temporal correlation, the second chroma quantization parameter offset.

Further to the third embodiments, the video sequence comprises a luma channel, a first color channel, and a second color channel and the system further comprises means for determining, using only the first color channel of the video sequence, a first color channel temporal correlation value corresponding to at least a portion of the video sequence including the first and second pictures, means for determining, using only the second color channel of the video sequence, a second color channel temporal correlation value corresponding to at least the portion of the video sequence, and means for generating a first color channel chroma quantization parameter offset based on the first color channel temporal correlation value and a second color channel chroma quantization parameter offset, different than the first color channel chroma quantization parameter offset, based on the second color channel temporal correlation value, wherein the means for transforming the video sequence to the compressed bitstream comprise means for coding the first color channel of the first picture using the first color channel chroma quantization parameter offset and the second color channel of the first picture using the second color channel chroma quantization parameter offset.

Further to the third embodiments, the video sequence comprises a luma channel, a first color channel, and a second color channel and the system further comprises means for determining, using only the first color channel of the video sequence, a first color channel temporal correlation value corresponding to at least a portion of the video sequence including the first and second pictures, means for determining, using only the second color channel of the video sequence, a second color channel temporal correlation value corresponding to at least the portion of the video sequence, and means for generating a first color channel chroma quantization parameter offset based on the first color channel temporal correlation value and a second color channel chroma quantization parameter offset, different than the first color channel chroma quantization parameter offset, based on the second color channel temporal correlation value, wherein the means for transforming the video sequence to the compressed bitstream comprise means for coding the first color channel of the first picture using the first color channel chroma quantization parameter offset and the second color channel of the first picture using the second color channel chroma quantization parameter offset, wherein the means for generating the first color channel chroma quantization parameter offset comprise means for determining the first color channel temporal correlation value satisfies a threshold indicative of strong temporal correlation and means for reducing, in response to the first color channel having a strong temporal correlation, the first chroma quantization parameter offset to generate the first color channel chroma quantization parameter offset.

Further to the third embodiments, the hierarchical coding structure further indicates a third picture of the video sequence is to be coded with a higher quality priority than the second picture and a lower quality priority than the first picture and the system further comprises means for generating a third chroma quantization parameter offset for the third picture, wherein the third chroma quantization parameter offset is greater than or equal to the first chroma quantization parameter offset and less than or equal to the second chroma quantization parameter offset in response to the third picture having a higher quality priority than the second picture and a lower quality priority than the first picture.

Further to the third embodiments, the system further comprises means for determining a second video sequence is to be coded with a non-hierarchical coding structure and means for periodically adjusting a chroma quantization parameter offset for pictures of the second video sequence.

In one or more fourth embodiments, at least one machine readable medium comprises a plurality of instructions that, in response to being executed on a computing device, cause the computing device to perform video coding by determining a hierarchical coding structure for pictures of a video sequence to be coded, wherein the hierarchical coding structure indicates a first picture of the video sequence is to be coded with a higher quality priority than a second picture of the video sequence, generating a first chroma quantization parameter offset for the first picture and a second chroma quantization parameter offset for the second picture, wherein the second chroma quantization parameter offset is greater than or equal to the first chroma quantization parameter offset in response to the first picture having a higher quality priority than the second picture, and transforming the video sequence to a compressed bitstream based in part on compressing the first picture based on the first chroma quantization parameter offset and the second picture based on the second chroma quantization parameter offset.

Further to the fourth embodiments, the machine readable medium further comprises a plurality of instructions that, in response to being executed on the computing device, cause the computing device to perform video coding by determining a temporal correlation value corresponding to at least a portion of the video sequence including the first and second pictures, determining the temporal correlation value satisfies a threshold indicative of the portion of the video sequence having a strong temporal correlation, and reducing, prior to transforming the video sequence and in response to the portion of the video sequence having a strong temporal correlation, the first chroma quantization parameter offset.

Further to the fourth embodiments, the machine readable medium further comprises a plurality of instructions that, in response to being executed on the computing device, cause the computing device to perform video coding by determining a temporal correlation value corresponding to at least a portion of the video sequence including the first and second pictures, determining the temporal correlation value does not satisfy a threshold indicative of the portion of the video sequence having a strong temporal correlation, increasing, prior to transforming the video sequence and in response to the portion of the video sequence having a weak temporal correlation, the first chroma quantization parameter offset, and decreasing, prior to transforming the video sequence and in response to the portion of the video sequence having a weak temporal correlation, the second chroma quantization parameter offset.

Further to the fourth embodiments, the video sequence comprises a luma channel, a first color channel, and a second color channel and the machine readable medium further comprises a plurality of instructions that, in response to being executed on the computing device, cause the computing device to perform video coding by determining, using only the first color channel of the video sequence, a first color channel temporal correlation value corresponding to at least a portion of the video sequence including the first and second pictures, determining, using only the second color channel of the video sequence, a second color channel temporal correlation value corresponding to at least the portion of the video sequence, and generating a first color channel chroma quantization parameter offset based on the first color channel temporal correlation value and a second color channel chroma quantization parameter offset, different than the first color channel chroma quantization parameter offset, based on the second color channel temporal correlation value, wherein transforming the video sequence to the compressed bitstream comprises coding the first color channel of the first picture using the first color channel chroma quantization parameter offset and the second color channel of the first picture using the second color channel chroma quantization parameter offset.

Further to the fourth embodiments, the hierarchical coding structure further indicates a third picture of the video sequence is to be coded with a higher quality priority than the second picture and a lower quality priority than the first picture and the machine readable medium further comprises a plurality of instructions that, in response to being executed on the computing device, cause the computing device to perform video coding by generating a third chroma quantization parameter offset for the third picture, wherein the third chroma quantization parameter offset is greater than or equal to the first chroma quantization parameter offset and less than or equal to the second chroma quantization parameter offset in response to the third picture having a higher quality priority than the second picture and a lower quality priority than the first picture.

Further to the fourth embodiments, the machine readable medium further comprises a plurality of instructions that, in response to being executed on the computing device, cause the computing device to perform video coding by determining a second video sequence is to be coded with a non-hierarchical coding structure and periodically adjusting a chroma quantization parameter offset for pictures of the second video sequence.

In one or more fifth embodiments, at least one machine readable medium may include a plurality of instructions that in response to being executed on a computing device, causes the computing device to perform a method according to any one of the above embodiments.

In one or more sixth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A computer-implemented method for video coding comprising:
    determining a hierarchical coding structure for pictures of a video sequence to be coded, wherein the hierarchical coding structure indicates a first picture of the video sequence is to be coded with a higher quality priority than a second picture of the video sequence;
    generating a first chroma quantization parameter offset for the first picture and a second chroma quantization parameter offset for the second picture, wherein the second chroma quantization parameter offset is greater than or equal to the first chroma quantization parameter offset in response to the first picture having a higher quality priority than the second picture;
    determining strong temporal correlation among a first plurality of pictures of the pictures of the video sequence, wherein the first plurality of pictures comprises the first and second pictures;
    reducing, in response to the strong temporal correlation among the first plurality of the pictures and the first picture being a higher quality priority than the second picture, the first chroma quantization parameter offset to a final first chroma quantization parameter offset; and
    transforming the video sequence to a compressed bitstream based in part on compressing the first picture based on the final first chroma quantization parameter offset and the second picture based on the second chroma quantization parameter offset.

2. The method of claim 1, wherein determining the strong temporal correlation among the first plurality of pictures comprises:

determining a temporal correlation value corresponding to the first plurality of pictures; and
determining the temporal correlation value satisfies a threshold indicative of the first plurality of pictures having strong temporal correlation.

3. The method of claim 1, further comprising:
increasing, prior to transforming the video sequence and in response to the strong temporal correlation among the first plurality of the pictures, the second chroma quantization parameter offset.

4. The method of claim 1, further comprising:
determining a temporal correlation value corresponding to a second plurality of pictures of the pictures of the video sequence, wherein the second plurality of pictures comprises third and fourth pictures of the video sequence having third and fourth chroma quantization parameter offsets, respectively, and wherein the third picture of the video sequence is to be coded with a higher quality priority than the fourth picture;
determining the temporal correlation value does not satisfy a threshold indicative of the second plurality of pictures having strong temporal correlation;
increasing, prior to transforming the video sequence and in response to the second plurality of pictures having weak temporal correlation, the third chroma quantization parameter offset; and
decreasing, prior to transforming the video sequence and in response to the second plurality of pictures having weak temporal correlation, the fourth chroma quantization parameter offset.

5. The method of claim 1, wherein the video sequence comprises a luma channel, a first color channel, and a second color channel, and the method further comprises:
determining, using only the first color channel of the video sequence, a first color channel temporal correlation value corresponding to a second plurality of pictures of the pictures of the video sequence, wherein the second plurality of pictures comprises third and fourth pictures of the video sequence having third and fourth chroma quantization parameter offsets, respectively, and wherein the third picture of the video sequence is to be coded with a higher quality priority than the fourth picture;
determining, using only the second color channel of the video sequence, a second color channel temporal correlation value corresponding to the second plurality of pictures; and
generating a first color channel chroma quantization parameter offset based on the first color channel temporal correlation value and a second color channel chroma quantization parameter offset, different than the first color channel chroma quantization parameter offset, based on the second color channel temporal correlation value, wherein transforming the video sequence to the compressed bitstream comprises coding the first color channel of the third picture using the first color channel chroma quantization parameter offset and the second color channel of the third picture using the second color channel chroma quantization parameter offset.

6. The method of claim 5, wherein generating the first color channel chroma quantization parameter offset comprises:
determining the first color channel temporal correlation value satisfies a threshold indicative of strong temporal correlation; and
reducing, in response to the first color channel having strong temporal correlation, the first chroma quantization parameter offset to generate the first color channel chroma quantization parameter offset.

7. The method of claim 6, wherein generating the second color channel chroma quantization parameter offset comprises:
determining the second color channel temporal correlation value does not satisfy the threshold indicative of strong temporal correlation; and
increasing, in response to the second color channel having weak temporal correlation, the second chroma quantization parameter offset to generate the second color channel chroma quantization parameter offset.

8. The method of claim 1, wherein the hierarchical coding structure further indicates a third picture of the video sequence is to be coded with a higher quality priority than the second picture and a lower quality priority than the first picture, the method further comprising:
generating a third chroma quantization parameter offset for the third picture, wherein the third chroma quantization parameter offset is greater than or equal to the first chroma quantization parameter offset and less than or equal to the second chroma quantization parameter offset in response to the third picture having a higher quality priority than the second picture and a lower quality priority than the first picture.

9. The method of claim 1, further comprising:
determining a second video sequence is to be coded with a non-hierarchical coding structure; and
periodically adjusting a chroma quantization parameter offset for pictures of the second video sequence.

10. The method of claim 9, wherein periodically adjusting the chroma quantization parameter offset comprises reducing the chroma quantization parameter offset for every Nth picture of the second video sequence, wherein N is an integer greater than 1.

11. The method of claim 1, further comprising:
translating a luma quantization parameter corresponding to the first picture to a chroma quantization parameter corresponding to the first picture using a look-up table; and
adjusting the chroma quantization parameter by the first chroma quantization parameter offset to generate an adjusted chroma quantization parameter, wherein transforming the video sequence to the compressed bitstream comprises quantizing transform coefficients of the first picture using the adjusted chroma quantization parameter.

12. The method of claim 1, wherein the compressed bitstream comprises a picture level or slice level parameter set including the first and second chroma quantization parameter offsets, and the method further comprises at least one of storing the compressed bitstream to electronic storage or transmitting the compressed bitstream to a remote device.

13. A system for video coding comprising:
a storage to store pictures of a video sequence to be coded; and
a processor coupled to the memory, the processor to determine a hierarchical coding structure for the pictures of the video sequence, wherein the hierarchical coding structure indicates a first picture of the video sequence is to be coded with a higher quality priority than a second picture of the video sequence, to generate a first chroma quantization parameter offset for the first picture and a second chroma quantization parameter offset for the second picture, wherein the second chroma quantization parameter offset is greater than or equal to the first chroma quantization parameter offset in response to the first picture having a higher quality priority than the second picture, to determine strong temporal correlation among a first plurality of pictures of the pictures of the video sequence, wherein the first plurality of pictures comprises the first and second pictures, to reduce, in response to the strong temporal correlation among the first plurality of the pictures and the first picture being a higher quality priority than the second picture, the first chroma quantization parameter offset to a final first chroma quantization parameter offset, and to transform the video sequence to a compressed bitstream based in part on compression of the first picture based on the final first chroma quantization parameter offset and the second picture based on the second chroma quantization parameter offset.

14. The system of claim 13, wherein the processor is further to determine the strong temporal correlation among the first plurality of pictures comprises the processor to determine a temporal correlation value corresponding to the first plurality of pictures and to determine the temporal correlation value satisfies a threshold indicative of the first plurality of pictures having strong temporal correlation.

15. The system of claim 13, wherein the processor is further to determine a temporal correlation value corresponding to a second plurality of pictures of the pictures of the video sequence, wherein the second plurality of pictures comprises third and fourth pictures of the video sequence having third and fourth chroma quantization parameter offsets, respectively, and wherein the third picture of the video sequence is to be coded with a higher quality priority than the fourth picture, to determine the temporal correlation value does not satisfy a threshold indicative of the second plurality of pictures having strong temporal correlation, to increase, prior to transforming the video sequence and in response to the second plurality of pictures having weak temporal correlation, the third chroma quantization parameter offset, and to decrease, prior to transforming the video sequence and in response to the second plurality of pictures having weak temporal correlation, the fourth chroma quantization parameter offset.

16. The system of claim 13, wherein the video sequence comprises a luma channel, a first color channel, and a second color channel, and the processor is further to determine, using only the first color channel of the video sequence, a first color channel temporal correlation value corresponding to a second plurality of pictures of the pictures of the video sequence, wherein the second plurality of pictures comprises third and fourth pictures of the video sequence having third and fourth chroma quantization parameter offsets, respectively, and wherein the third picture of the video sequence is to be coded with a higher quality priority than the fourth picture, to determine, using only the second color channel of the video sequence, a second color channel temporal correlation value corresponding to the second plurality of pictures, and to generate a first color channel chroma quantization parameter offset based on the first color channel temporal correlation value and a second color channel chroma quantization parameter offset, different than the first color channel chroma quantization parameter offset, based on the second color channel temporal correlation value, wherein to transform the video sequence to the compressed bitstream comprises the processor to code the first color channel of the third picture using the first color channel chroma quantization parameter offset and the second color channel of the third picture using the second color channel chroma quantization parameter offset.

17. The system of claim 16, wherein to generate the first color channel chroma quantization parameter offset comprises the processor to determine the first color channel temporal correlation value satisfies a threshold indicative of strong temporal correlation and to reduce, in response to the first color channel having strong temporal correlation, the first chroma quantization parameter offset to generate the first color channel chroma quantization parameter offset.

18. The system of claim 13, wherein the hierarchical coding structure further indicates a third picture of the video sequence is to be coded with a higher quality priority than the second picture and a lower quality priority than the first picture, and the processor is further to generate a third chroma quantization parameter offset for the third picture, wherein the third chroma quantization parameter offset is greater than or equal to the first chroma quantization parameter offset and less than or equal to the second chroma quantization parameter offset in response to the third picture having a higher quality priority than the second picture and a lower quality priority than the first picture.

19. The system of claim 13, wherein the processor is further to determine a second video sequence is to be coded with a non-hierarchical coding structure and to periodically adjust a chroma quantization parameter offset for pictures of the second video sequence by reduction of the chroma quantization parameter offset for every Nth picture of the second video sequence, wherein N is an integer greater than 1.

20. At least one non-transitory machine readable medium comprising a plurality of instructions that, in response to being executed on a computing device, cause the computing device to perform video coding by:
  determining a hierarchical coding structure for pictures of a video sequence to be coded, wherein the hierarchical coding structure indicates a first picture of the video sequence is to be coded with a higher quality priority than a second picture of the video sequence;
  generating a first chroma quantization parameter offset for the first picture and a second chroma quantization parameter offset for the second picture, wherein the second chroma quantization parameter offset is greater than or equal to the first chroma quantization parameter offset in response to the first picture having a higher quality priority than the second picture;
  determining strong temporal correlation among a first plurality of pictures of the pictures of the video sequence, wherein the first plurality of pictures comprises the first and second pictures;
  reducing, in response to the strong temporal correlation among the first plurality of the pictures and the first picture being a higher quality priority than the second picture, the first chroma quantization parameter offset to a final first chroma quantization parameter offset; and
  transforming the video sequence to a compressed bitstream based in part on compressing the first picture based on the final first chroma quantization parameter offset and the second picture based on the second chroma quantization parameter offset.

21. The non-transitory machine readable medium of claim 20, wherein determining the strong temporal correlation among the first plurality of pictures comprises:
  determining a temporal correlation value corresponding to the first plurality of pictures; and determining the temporal correlation value satisfies a threshold indicative of the first plurality of pictures having strong temporal correlation.

22. The non-transitory machine readable medium of claim 20, further comprising a plurality of instructions that, in response to being executed on the computing device, cause the computing device to perform video coding by:
determining a temporal correlation value corresponding to a second plurality of pictures of the pictures of the video sequence, wherein the second plurality of pictures comprises third and fourth pictures of the video sequence having third and fourth chroma quantization parameter offsets, respectively, and wherein the third picture of the video sequence is to be coded with a higher quality priority than the fourth picture;
determining the temporal correlation value does not satisfy a threshold indicative of the second plurality of pictures having strong temporal correlation;
increasing, prior to transforming the video sequence and in response to the second plurality of pictures having weak temporal correlation, the third chroma quantization parameter offset; and
decreasing, prior to transforming the video sequence and in response to the second plurality of pictures having weak temporal correlation, the fourth chroma quantization parameter offset.

23. The non-transitory machine readable medium of claim 20, wherein the video sequence comprises a luma channel, a first color channel, and a second color channel, the machine readable medium further comprising a plurality of instructions that, in response to being executed on the computing device, cause the computing device to perform video coding by:
determining, using only the first color channel of the video sequence, a first color channel temporal correlation value corresponding to at least a portion of the video sequence including the first and second pictures;
determining, using only the first color channel of the video sequence, a first color channel temporal correlation value corresponding to a second plurality of pictures of the pictures of the video sequence, wherein the second plurality of pictures comprises third and fourth pictures of the video sequence having third and fourth chroma quantization parameter offsets, respectively, and wherein the third picture of the video sequence is to be coded with a higher quality priority than the fourth picture;
determining, using only the second color channel of the video sequence, a second color channel temporal correlation value corresponding to the second plurality of pictures; and
generating a first color channel chroma quantization parameter offset based on the first color channel temporal correlation value and a second color channel chroma quantization parameter offset, different than the first color channel chroma quantization parameter offset, based on the second color channel temporal correlation value, wherein transforming the video sequence to the compressed bitstream comprises coding the first color channel of the third picture using the first color channel chroma quantization parameter offset and the second color channel of the third picture using the second color channel chroma quantization parameter offset.

24. The non-transitory machine readable medium of claim 20, wherein the hierarchical coding structure further indicates a third picture of the video sequence is to be coded with a higher quality priority than the second picture and a lower quality priority than the first picture, the machine readable medium further comprising a plurality of instructions that, in response to being executed on the computing device, cause the computing device to perform video coding by:
generating a third chroma quantization parameter offset for the third picture, wherein the third chroma quantization parameter offset is greater than or equal to the first chroma quantization parameter offset and less than or equal to the second chroma quantization parameter offset in response to the third picture having a higher quality priority than the second picture and a lower quality priority than the first picture.

25. The non-transitory machine readable medium of claim 20, further comprising a plurality of instructions that, in response to being executed on the computing device, cause the computing device to perform video coding by:
determining a second video sequence is to be coded with a non-hierarchical coding structure; and
periodically adjusting a chroma quantization parameter offset for pictures of the second video sequence by reducing the chroma quantization parameter offset for every Nth picture of the second video sequence, wherein N is an integer greater than 1.

* * * * *